(12) United States Patent
Fulkerson et al.

(10) Patent No.: US 8,167,517 B2
(45) Date of Patent: *May 1, 2012

(54) PUMP WITH SUCTION AND PRESSURE CONTROL FOR DRY PARTICULATE MATERIAL

(75) Inventors: Terrence M. Fulkerson, Brunswick Hills, OH (US); Stephen G. Nemethy, Lakewood, OH (US); Terry John Thompson, Wakeman, OH (US); Jeffrey A. Perkins, Amherst, OH (US); Joseph G. Schroeder, North Royalton, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/774,951

(22) Filed: May 6, 2010

(65) Prior Publication Data

US 2010/0221125 A1  Sep. 2, 2010

Related U.S. Application Data

(63) Continuation of application No. 11/426,062, filed on Jun. 23, 2006, now Pat. No. 7,731,456.

(60) Provisional application No. 60/725,002, filed on Oct. 7, 2005.

(51) Int. Cl.
*B65G 53/58* (2006.01)

(52) U.S. Cl. .............. 406/97; 406/11; 406/14; 406/197

(58) Field of Classification Search .................... 406/10, 406/11, 12, 14, 15

See application file for complete search history.

(56) References Cited

U.S. PATENT DOCUMENTS

| 3,932,065 | A | | 1/1976 | Ginsberg et al. |
| 3,951,572 | A | | 4/1976 | Ray, Jr. et al. |
| 4,391,860 | A | * | 7/1983 | Rotolico et al. ............... 427/446 |
| 4,490,077 | A | * | 12/1984 | Shimada et al. ................ 406/14 |
| 4,900,199 | A | | 2/1990 | Spaulding et al. |
| 5,131,350 | A | | 7/1992 | Buschor |
| 5,273,406 | A | | 12/1993 | Feygin |
| 5,407,305 | A | | 4/1995 | Wallace |
| 5,487,624 | A | | 1/1996 | Toyota et al. |

(Continued)

FOREIGN PATENT DOCUMENTS

EP  1106547  6/2001

(Continued)

OTHER PUBLICATIONS

European Search Report for European Patent Application No. 06019948 dated Feb. 19, 2008.

*Primary Examiner* — Gene Crawford
*Assistant Examiner* — William R Harp
(74) *Attorney, Agent, or Firm* — Calfee, Halter & Griswold LLP

(57) ABSTRACT

A pump for particulate material includes a pump chamber wherein material flows into the pump chamber under negative pressure and flows out of the pump chamber under positive pressure. A plurality of pinch valves are provided to control flow of material into and out of the pump chamber. The pinch valves are operated independent of each other and of the pump cycle rate. A modular design of the pump is provided. A pump control feature is provided for air flow rate control during positive and negative pressure conditions.

9 Claims, 29 Drawing Sheets

U.S. PATENT DOCUMENTS

| | | |
|---|---|---|
| 5,702,209 A | 12/1997 | Mauchle |
| 5,739,429 A | 4/1998 | Schmitkons et al. |
| 5,813,801 A | 9/1998 | Newbolt et al. |
| 6,176,647 B1 | 1/2001 | Itoh |
| 6,325,572 B1 | 12/2001 | Dietrich |
| 6,382,521 B1 | 5/2002 | Haas |
| 6,443,670 B1 | 9/2002 | Haas et al. |
| 6,478,513 B1 | 11/2002 | Higuchi et al. |
| 6,508,610 B2 | 1/2003 | Dietrich |
| 6,623,215 B2 | 9/2003 | Dietrich |
| 6,703,937 B1 * | 3/2004 | Franz et al. .................. 340/607 |
| 6,835,229 B2 | 12/2004 | Brown et al. |
| 7,144,213 B2 | 12/2006 | Cartwright |
| 7,150,585 B2 | 12/2006 | Kleineidam et al. |
| 7,163,359 B2 | 1/2007 | Moser |
| 7,287,964 B2 | 10/2007 | Sanwald |
| 7,410,329 B2 | 8/2008 | Simontacchi |
| 2002/0129765 A1 | 9/2002 | Mauchle |
| 2002/0150677 A1 | 10/2002 | Morita et al. |
| 2003/0148028 A1 | 8/2003 | Kimura et al. |
| 2005/0126476 A1 | 6/2005 | Shutic et al. |
| 2005/0158187 A1 | 7/2005 | Fulkerson et al. |
| 2005/0178325 A1 | 8/2005 | Herre et al. |
| 2005/0207901 A1 | 9/2005 | Klobucar et al. |
| 2005/0229845 A1 | 10/2005 | Mather et al. |
| 2006/0093442 A1 | 5/2006 | Kleineidam et al. |
| 2006/0185586 A1 | 8/2006 | Durr et al. |
| 2007/0081865 A1 | 4/2007 | Kleineidam et al. |
| 2007/0095945 A1 | 5/2007 | Keudell et al. |

FOREIGN PATENT DOCUMENTS

| | | |
|---|---|---|
| EP | 1574261 | 9/2005 |
| JP | 9-71325 | 3/1997 |
| WO | 82/00349 | 2/1982 |
| WO | 2005005060 | 1/2005 |

* cited by examiner

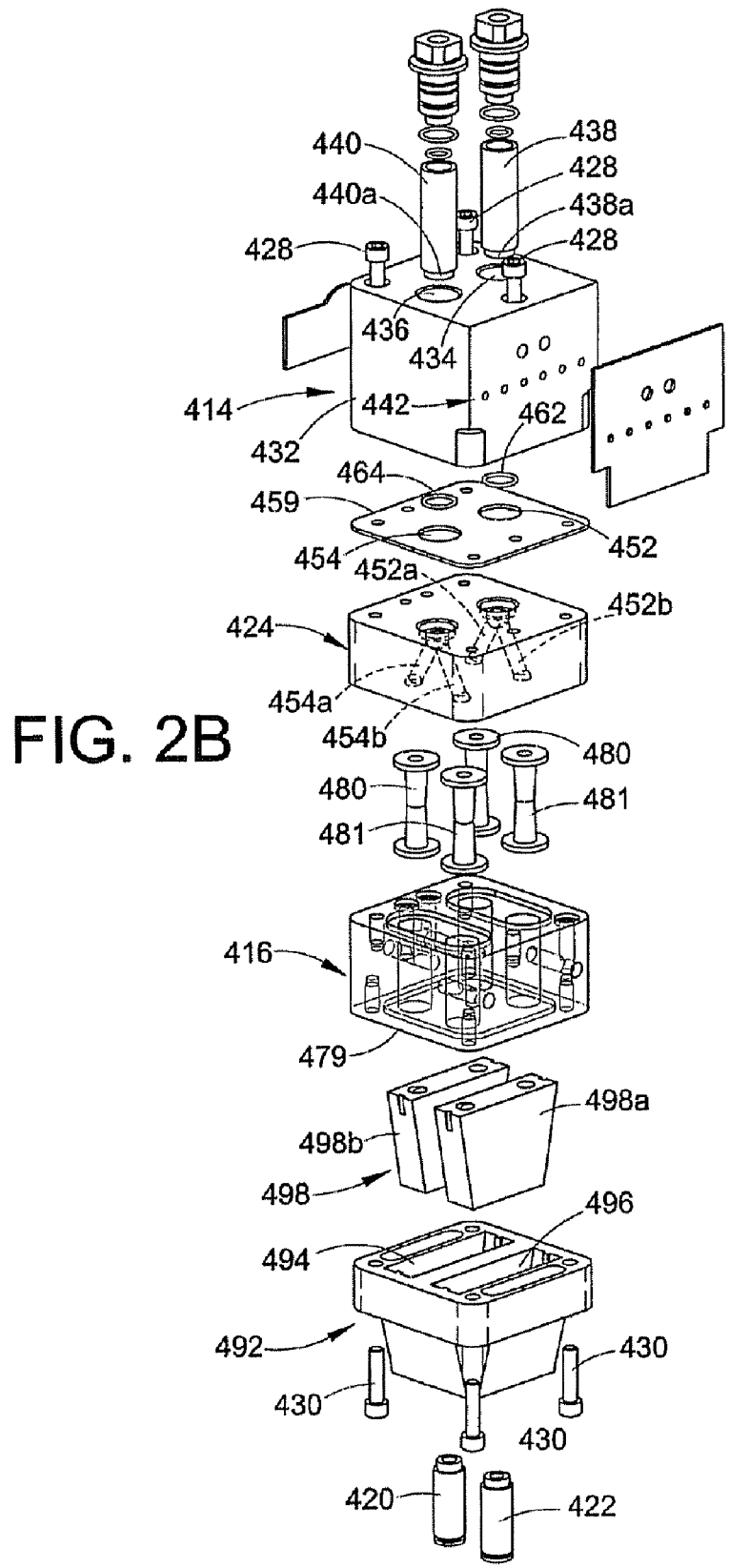

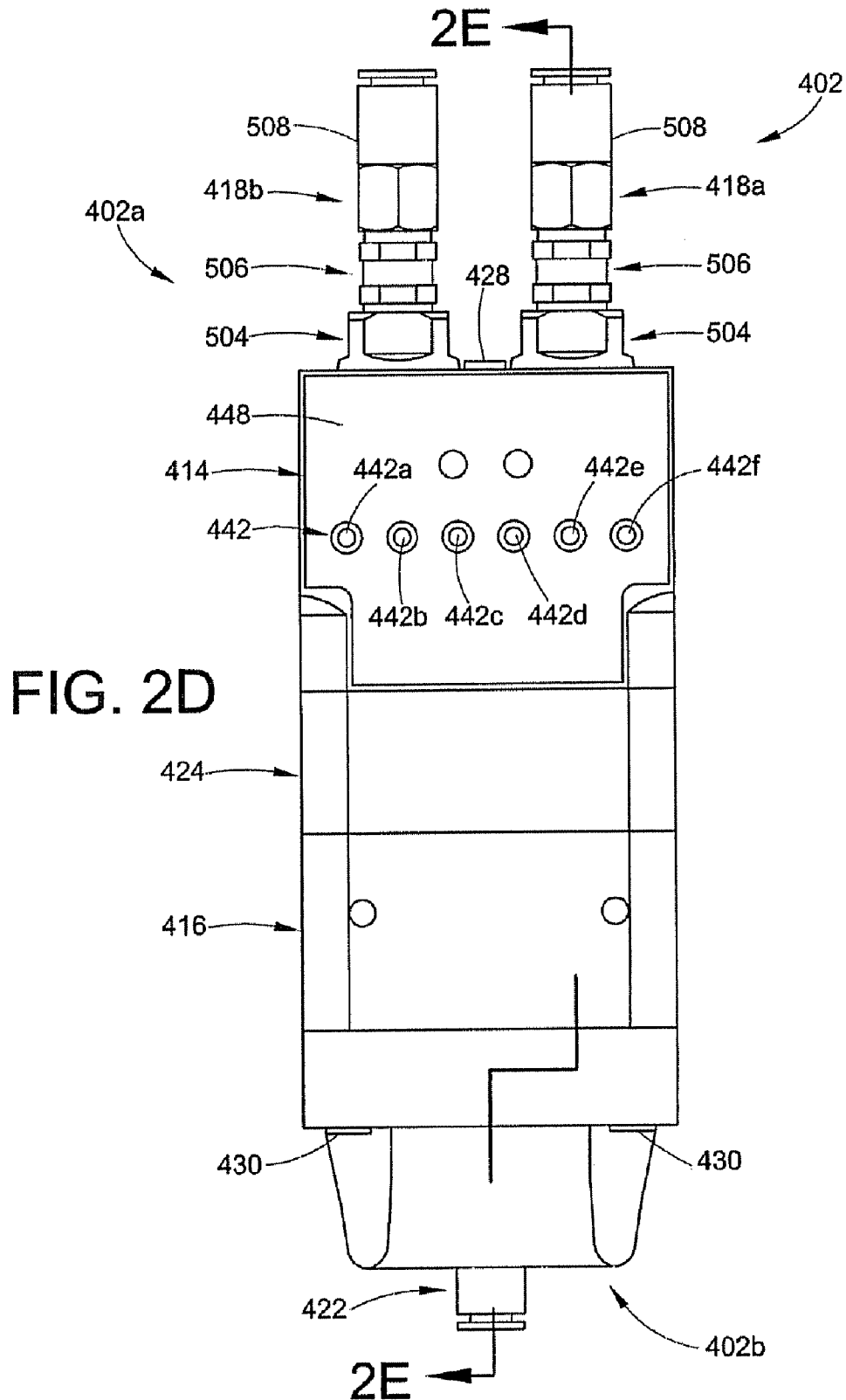

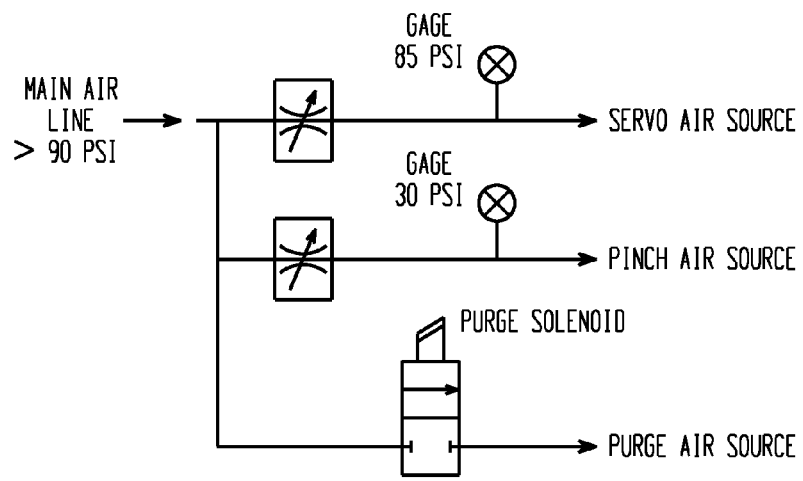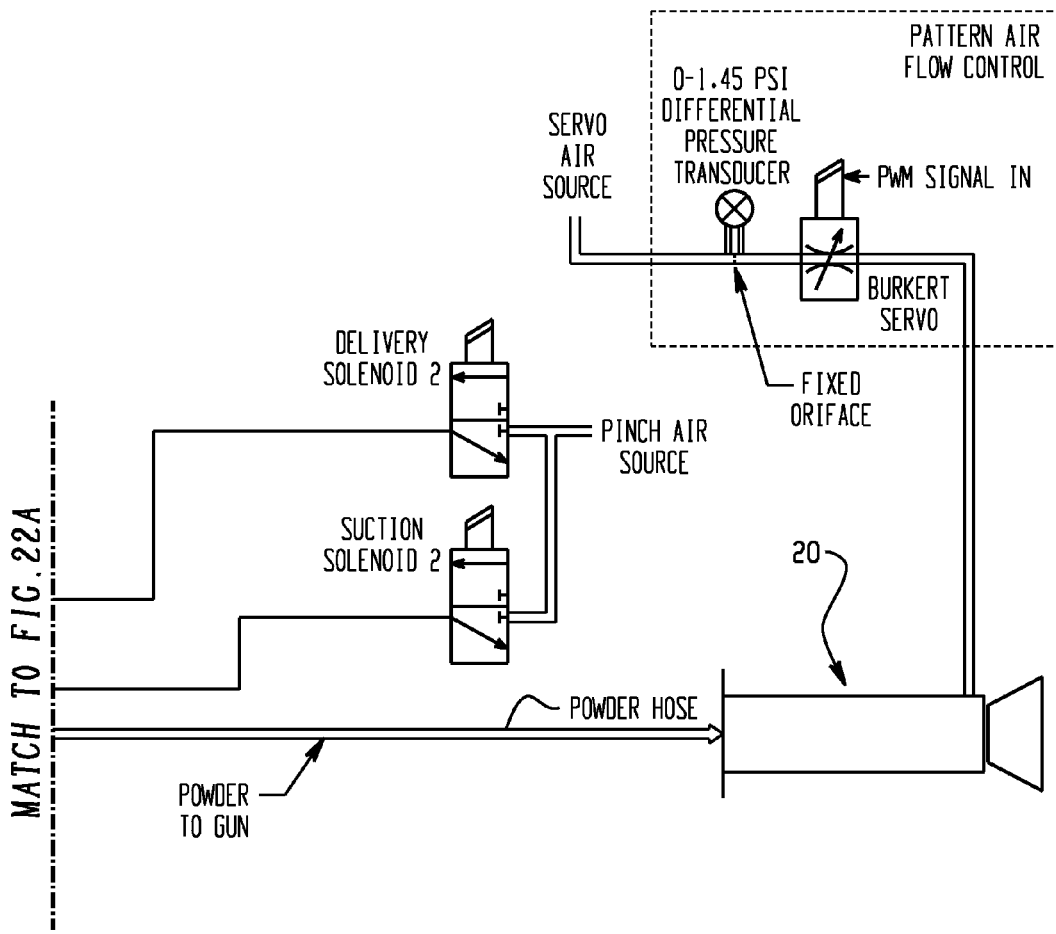
Fig. 22B

8,167,517 B2

PUMP WITH SUCTION AND PRESSURE CONTROL FOR DRY PARTICULATE MATERIAL

Related Applications

This application is a continuation of pending U.S. Ser. No. 11/426,062 filed on Jun. 23, 2006, for PUMP SUCTION AND PRESSURE CONTROL FOR DRY PARTICULATE MATERIAL, which claims the benefit of pending U.S. Provisional patent application Ser. No. 60/725,002 filed on Oct. 7, 2005, for DENSE PHASE PUMP IMPROVEMENTS, the entire disclosures of which are fully incorporated herein by reference.

TECHNICAL FIELD OF THE INVENTION

The inventions relate generally to material application and transfer systems, for example but not limited to powder coating material application systems. More particularly, the inventions relate to a pump and pump control functions for such systems.

BACKGROUND OF THE INVENTION

Material application systems are used to apply one or more materials in one or more layers to an object. General examples are powder coating systems, other particulate material application systems such as may be used in the food processing and chemical industries. These are but a few examples of a wide and numerous variety of systems used to apply particulate materials to an object.

The application of dry particulate material is especially challenging on a number of different levels. An example, but by no means a limitation on the use and application of the present inventions, is the application of powder coating material to objects using a powder spray gun. Because sprayed powder tends to expand into a cloud or diffused spray pattern, known powder application systems use a spray booth for containment. Powder particles that do not adhere to the target object are generally referred to as powder overspray, and these particles tend to fall randomly within the booth and will alight on almost any exposed surface within the spray booth. Therefore, cleaning time and color change times are strongly related to the amount of surface area that is exposed to powder overspray.

In addition to surface areas exposed to powder overspray, color change times and cleaning are strongly related to the amount of interior surface area exposed to the flow of powder during an application process. Examples of such interior surface areas include all surface areas that form the powder flow path, from a supply of the powder all the way through the powder spray gun. The powder flow path typically includes a pump that is used to transfer powder from a powder supply to one or more spray guns. Hoses are commonly used to connect the pumps to the guns and the supply.

There are two generally known types of dry particulate material transfer processes, referred to herein as dilute phase and dense phase. Dilute phase systems utilize a substantial quantity of air to push material through one or more hoses or other conduit from a supply to a spray applicator. A common dilute phase pump design used in powder coating systems is a venturi pump which introduces a large volume of air under pressure and higher velocity into the powder flow. In order to achieve adequate powder flow rates (in pounds per minute or pounds per hour for example), the components that make up the flow path must be large enough to accommodate the flow with such high air to material (in other words lean flow) otherwise significant back pressure and other deleterious effects can occur.

Dense phase systems on the other hand are characterized by a high material to air ratio (in other words a "rich" flow). A dense phase pump is described in pending U.S. patent application Ser. No. 10/501,693 filed on Jul. 16, 2004 for PROCESS AND EQUIPMENT FOR THE CONVEYANCE OF POWDERED MATERIAL, publication WO 05-0095071 published on May 5, 2005, the entire disclosures of which are fully incorporated herein by reference, and which are owned by the assignee of the present invention. This pump is characterized in general by a pump chamber that is partially defined by a gas permeable member. Material, such as powder coating material as an example, is drawn into the chamber at one end by gravity and/or negative pressure and is pushed out of the chamber through an opposite end by positive air pressure. This pump design is very effective for transferring material, in part due to the novel arrangement of a gas permeable member forming part of the pump chamber. The overall pump, however, in some cases may be less than optimal for purging, cleaning, color change, maintenance and material flow rate control.

SUMMARY OF THE INVENTION

The present disclosure is directed to various improvements in the pump design set forth in pending U.S. patent application Ser. No. 10/711,429 filed on Sep. 17, 2004 for DENSE PHASE PUMP FOR DRY PARTICULATE MATERIAL, publication no. WO 05-0158187 published on Jul. 21, 2005, the entire disclosures of which are fully incorporated herein by reference. The present improvements are generally directed to various control functions relating to operation of the pump. While the descriptions herein are presented in the context of a pump in accordance with the referenced disclosure, those skilled in the art will appreciate that these improvements may individually or collectively be incorporated into other pump designs and control functions for different pump designs, such as for example the 10/501,693 design referenced herein above.

In accordance with one inventive aspect, a pump control function includes applying suction to a volume to draw material into the volume during a suction time period that is isolated from a delivery time period during which positive pressure is applied to push material out of the volume. In a specific embodiment the suction duration or condition is generally centered within a suction cycle of the overall pump cycle. In another embodiment, the suction force initially is at a higher value or spike and then reduces to a lower value during the suction time duration. In yet another embodiment, the reduced suction force value is selected to produce a predetermined air flow rate from the volume during the suction duration.

In another inventive aspect, a pump control function includes applying suction to a volume to draw material into the volume from an inlet flow path and applying positive pressure to the volume to push powder out after the inlet flow path is closed. In a specific embodiment, application of the positive air pressure is delayed for a period of time to compensate for response time to close the inlet flow path to ensure that the inlet flow path is fully closed before the application of positive pressure to the volume.

In another inventive aspect, a pump control function includes controlling the air flow rate from a volume during a suction time period. In another embodiment, a pump control function includes controlling the air flow rate into the volume during a delivery time period. In still another embodiment, a pump control function includes controlling air flow rate into a volume during a delivery time period and air flow rate from a volume during a suction time period. For both types of control functions, in one embodiment flow rate is monitored by determining pressure drop across an orifice in the respective air flow path. In yet another embodiment, a control function includes maintaining predetermined minimum air flow rates to assure powder is sufficiently sucked in and pushed out of the volume, and alternatively using either air flow rate control function individually without the other.

In another inventive aspect, a pump control function may be realized with an air flow rate controller for suction, an air flow rate controller for positive pressure delivery, or both. In a specific embodiment, either air flow rate control may be effected by monitoring pressure drop across an orifice in the air flow path and adjusting a parameter so that the air flow rate is maintained at a predetermined minimum.

These and other inventive aspects and advantages of the present disclosure will be apparent to those skilled in the art from the following description of the exemplary embodiments in view of the accompanying drawings.

BRIEF DESCRIPTION OF THE DRAWINGS

FIGS. 2A-2C are assembled and exploded isometric views of a pump in accordance with the invention;

FIGS. 2D-2G are elevation and cross-sectional views of the assembled pump of FIG. 2A;

FIGS. 22A and 22B are a detailed schematic of an overall pneumatic diagram for a pump control using flow rate controllers for positive and vacuum pressure control.

Figure 1:
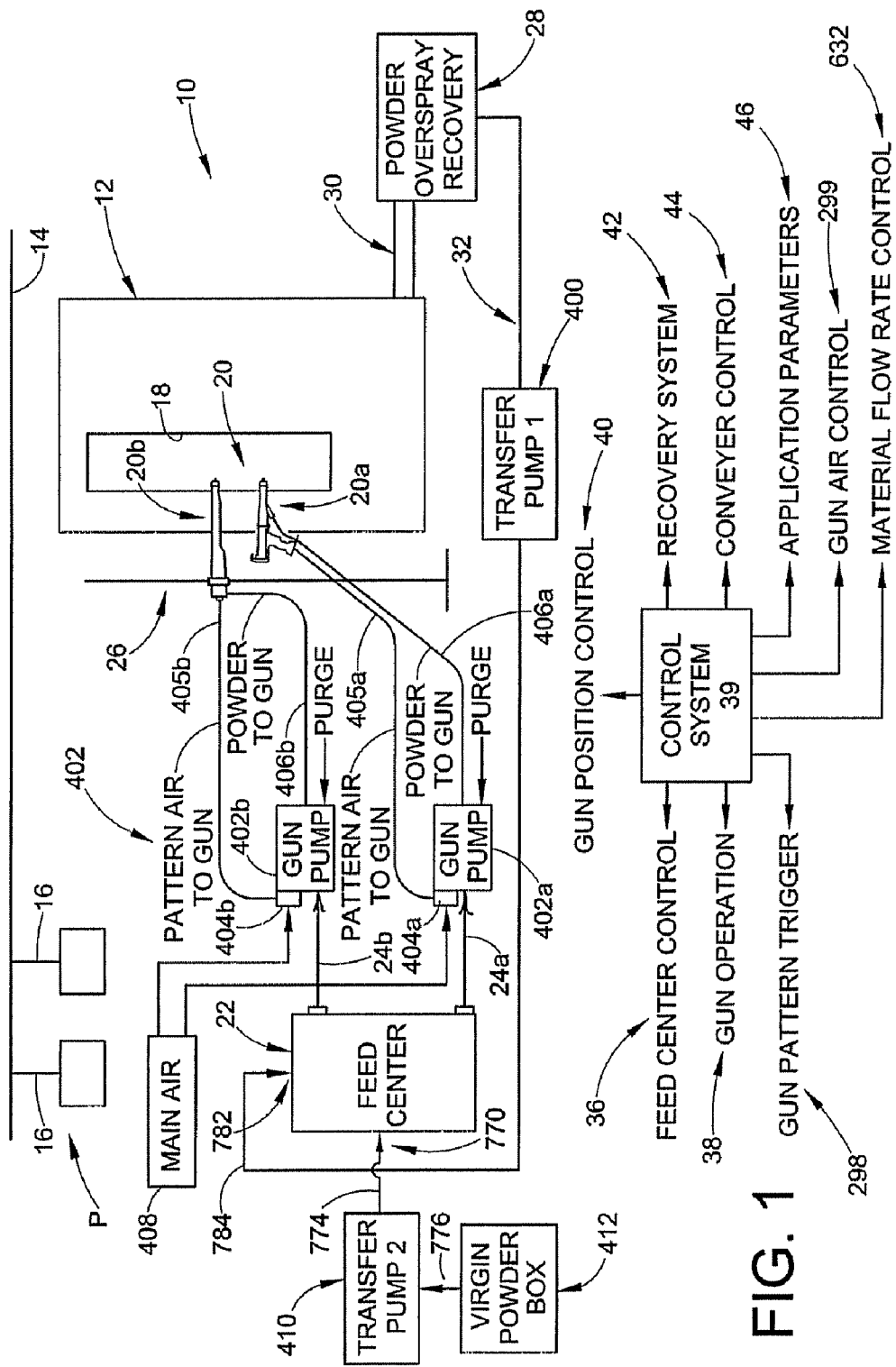
FIG. 1 is a simplified schematic diagram of a powder coating material application system utilizing the present invention.

DETAILED DESCRIPTION OF THE INVENTION
AND EXEMPLARY EMBODIMENTS THEREOF

The inventions contemplate a number of new aspects for a dense phase pump for particulate material. The pump may be used in combination with any number or type of spray applicator devices or spray guns and material supply. One or more of the various inventive aspects or concepts may find application in other pump designs, such as dilute phase pumps.

By "dense phase" is meant that the air present in the particulate flow is about the same as the amount of air used to fluidize the material at the supply such as a feed hopper. As used herein, "dense phase" and "high density" are used to convey the same idea of a low air volume mode of material flow in a pneumatic conveying system where not all of the material particles are carried in suspension. In such a dense phase system, the material is forced along a flow path by significantly less air volume as compared to a conventional dilute phase system, with the material flowing more in the nature of plugs that push each other along the passage, somewhat analogous to pushing the plugs as a piston through the passage. With smaller cross-sectional passages this movement can be effected under lower pressures.

In contrast, conventional flow systems tend to use a dilute phase which is a mode of material flow in a pneumatic conveying system where all the particles are carried in suspension. Conventional flow systems introduce a significant quantity of air into the flow stream in order to pump the material from a supply and push it through under positive pressure to the spray application devices. For example, most conventional powder coating spray systems utilize venturi pumps to draw fluidized powder from a supply into the pump. A venturi pump by design adds a significant amount of air to the powder stream. Typically, flow air and atomizing air are added to the powder to push the powder under positive pressure through a feed hose and an applicator device. Thus, in a conventional powder coating spray system, the powder is entrained in a high velocity high volume flow of air, thus necessitating large diameter powder passageways in order to attain usable powder flow rates.

Dense phase flow is oftentimes used in connection with the transfer of material to a closed vessel under high pressure. The present disclosure, in being directed to material application rather than simply transport or transfer of material alone, contemplates flow at substantially lower pressure and flow rates as compared to dense phase transfer under high pressure to a closed vessel. However, the disclosure also contemplates a dense phase transfer pump embodiment which can be used to transfer material to an open or closed vessel.

As compared to conventional dilute phase systems having air volume flow rates of about 3 to about 6 cfm (such as with a venturi pump arrangement, for example), the present invention may operate at about 0.8 to about 1.6 cfm, for example. Thus, in the present invention, powder delivery rates may be on the order of about 150 to about 300 grams per minute. These values are intended to be exemplary and not limiting.

Pumps in accordance with the present disclosure can be designed to operate at lower or higher air flow and material delivery values.

Dense phase versus dilute phase flow can also be thought of as rich versus lean concentration of material in the air stream, such that the ratio of material to air is much higher in a dense phase system. In other words, in a dense phase system the same amount of material per unit time is transiting a flow path cross-section (of a tube for example) of lesser area as compared to a dilute phase flow. For example, in some embodiments herein, the cross-sectional area of a powder feed tube is about one-fourth the area of a feed tube for a conventional venturi type system. For comparable flow of material per unit time then, the material is about four times denser in the air stream as compared to conventional dilute phase systems.

With reference to FIG. 1, in an exemplary embodiment, various inventive aspects are illustrated being used with a material application system, such as, for example, a typical powder coating spray system 10. Such an arrangement commonly includes a powder spray booth 12 in which an object or part P is to be sprayed with a powder coating material. The application of powder to the part P is generally referred to herein as a powder spray, coating or application operation procedure or process, however, there may be any number of control functions, steps and parameters that are controlled and executed before, during and after powder is actually applied to the part as will be described in greater detail herein below.

As is known, the part P is suspended from an overhead conveyor 14 using hangers 16 or any other conveniently suitable arrangements. The booth 12 includes one or more openings 18 through which one or more spray applicators 20 may be used to apply coating material to the part P as it travels through the booth 12. The applicators 20 may be of any number depending on the particular design of the overall system 10. Each applicator can be a manually operated device as with device 20a, or a system controlled device, referred to herein as an automatic applicator 20b, wherein the term "automatic" simply refers to the fact that an automatic applicator is mounted on a support and is triggered on and off by a control system, rather than being manually supported and manually triggered. The present disclosure is directed to manual and automatic spray applicators.

It is common in the powder coating material application industry to refer to the powder applicators as powder spray guns, and with respect to the exemplary embodiments herein we will use the terms applicator and gun interchangeably. However, it is intended that the inventions are useful with material application devices other than powder spray guns, and hence the more general term applicator is used to convey the idea that the inventions can be used in many particulate material application systems other than the exemplary powder coating material application system described herein. Some inventive aspects herein are likewise applicable to electrostatic spray guns as well as non-electrostatic spray guns. The inventions are also not limited by functionality associated with the word "spray". Although the inventions are especially suited to powder spray application, the pump and control concepts and methods disclosed herein may find use with other material application techniques beyond just spraying, whether such techniques are referred to as dispensing, discharge, application or other terminology that might be used to describe a particular type of material application device.

The spray guns 20 receive powder from a supply or feed center such as a hopper 22 or other material supply through an associated powder feed or supply hose 24. The automatic guns 20b typically are mounted on a support 26. The support 26 may be a simple stationary structure, or may be a movable structure, such as an oscillator that can move the guns up and down during a spraying operation, or a gun mover or reciprocator that can move the guns in and out of the spray booth, or a combination thereof.

The spray booth 12 is designed to contain powder overspray within the booth, usually by a large flow of containment air into the booth. This air flow into the booth is usually effected by a powder overspray reclamation or recovery system 28. The recovery system 28 pulls air with entrained powder overspray from the booth, such as for example through a duct 30. In some systems the powder overspray is returned to the feed center 22 as represented by the return line 32. In other systems the powder overspray is either dumped or otherwise reclaimed in a separate receptacle.

In the exemplary embodiment herein, powder is transferred from the recovery system 28 back to the feed center 22 by a first transfer pump 400, an exemplary embodiment of which is described hereinafter. A respective gun pump 402 is used to supply powder from the feed center 22 to an associated spray applicator or gun 20. For example, a first gun pump 402a is used to provide dense phase powder flow to the manual gun 20a and a second gun pump 402b is used to provide dense phase powder flow to the automatic gun 20b. Exemplary embodiments of the gun pumps 402 are described hereinafter.

Each gun pump 402 operates from pressurized gas such as ordinary air supplied to the gun by a pneumatic supply manifold 404. One inventive aspect provides a pump and manifold arrangement by which the pump 402 is mounted to the supply manifold 404 with a gasket or other seal device therebetween. This eliminates unnecessary plumbing between the manifold 404 and the pump 402. Although schematically illustrated in FIG. 1 as being directly joined, it is contemplated that in practice the manifolds 404 will be disposed in a cabinet or other enclosure and mounted to the pumps 402 with a wall of the cabinet therebetween. In this manner, the manifolds 404, which may include electrical power such as solenoid valves, are isolated from the spraying environment. The pump design also allows the pump to be positioned outside of the spraying environment in contrast to conventional venturi pumps.

The supply manifold 404 supplies pressurized air to its associated pump 402 for purposes that will be explained hereinafter. In addition, each supply manifold 404 includes a pressurized pattern air supply that is provided to the spray guns 20 via air hoses or lines 405. Main air 408 is provided to the supply manifold 404 from any convenient source within the manufacturing facility of the end user of the system 10. Each pump 402 supplies powder to its respective applicator 20 via a powder supply hose 406.

In the FIG. 1 embodiment, a second transfer pump 410 is used to transfer powder from a supply 412 of virgin powder (that is to say, unused) to the feed center 22. Those skilled in the art will understand that the number of required transfer pumps 410 and gun pumps 402 will be determined by the requirements of the overall system 10 as well as the spraying operations to be performed using the system 10.

Although the gun pump and the transfer pumps may be the same design, in the exemplary embodiments there are differences that will be described hereinafter. Those differences take into account that the gun pump preferably provides a smooth consistent flow of powder material to the spray applicators 20 in order to provide the best coating onto the objects P, whereas the transfer pumps 400 and 410 are simply used to move powder from one receptacle to another at a high enough flow rate and volume to keep up with the powder demand from the applicators and as optionally supplemented by the powder overspray collected by the recovery system 28.

Other than the pumps 400, 410 and 402, the selected design and operation of the material application system 10, including the spray booth 12, the conveyor 14, the guns 20, the recovery system 28, and the feed center or supply 22, form no necessary part of the present invention and may be selected based on the requirements of a particular coating application. A particular spray applicator, however, that is well suited for use with the present inventions is described in pending International patent application number PCT/US04/26887 for SPRAY APPLICATOR FOR PARTICULATE MATERIAL, filed on Aug. 18, 2004, the entire disclosure of which is incorporated herein by reference. However, many other applicator designs may be used as required for a particular application. A control system 39 likewise may be a conventional control system such as a programmable processor based system or other suitable control circuit. The control system 39 executes a wide variety of control functions and algorithms, typically through the use of programmable logic and program routines, which are generally indicated in FIG. 1 as including but not necessarily limited to feed center control 36 (for example supply controls and pump operation controls), gun operation control 38 (such as for example, gun trigger controls), gun position control 40 (such as for example control functions for the reciprocator/gun mover 26 when used), powder recovery system control 42 (for example, control functions for cyclone separators, after filter blowers and so on), conveyor control 44 and material application parameter controls 46 (such as for example, powder flow rates, applied film thickness, electrostatic or non-electrostatic application and so on). Conventional control system theory, design and programming may be utilized. The present disclosure, however, provides a number of inventive aspects and concepts relating to the control functions executed by the control system 39 as will be further described herein.

While the described embodiments herein are presented in the context of a dense phase pump for use in a powder coating material application system, those skilled in the art will readily appreciate that the present inventions may be used in many different dry particulate material application systems, including but not limited in any manner to: talc on tires, super-absorbents such as for diapers, food related material such as flour, sugar, salt and so on, desiccants, release agents, and pharmaceuticals. These examples are intended to illustrate the broad application of the inventions for dense phase application of particulate material to objects. The specific design and operation of the material application system selected provides no limitation on the present inventions except as otherwise expressly noted herein. Various inventive aspects and concepts herein may also find use in dilute phase systems.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and suncombinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Even from the general schematic illustration of FIG. 1 it can be appreciated that such complex systems can be very difficult and time consuming to clean and to provide for color change. Typical powder coating material is a very fine particulate and tends to be applied in a fine cloud or spray pattern directed at the objects being sprayed. Even with the use of electrostatic technology, a significant amount of powder overspray is inevitable. Cross contamination during color change is a significant issue in many industries, therefore it is important that the material application system be able to be thoroughly cleaned between color changes. Color changes however necessitate taking the material application system offline and thus is a significant cost driver. The present inventions are directed in part to providing a pump that is easier and faster to clean. Additional inventive features and aspects are applicable separately from the concern for cleanability and color change times.

Figure 2A:
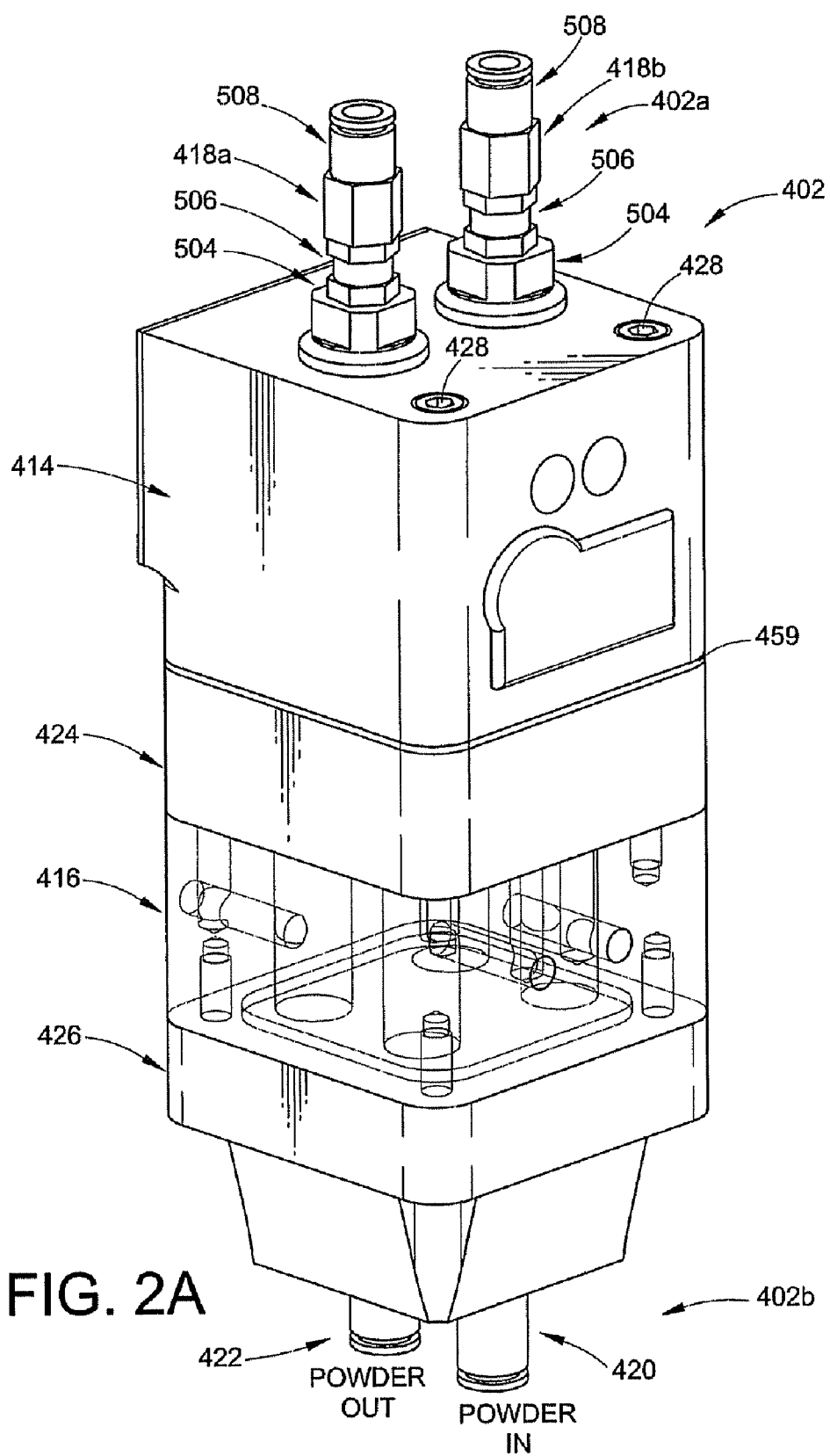
Figure 2C:
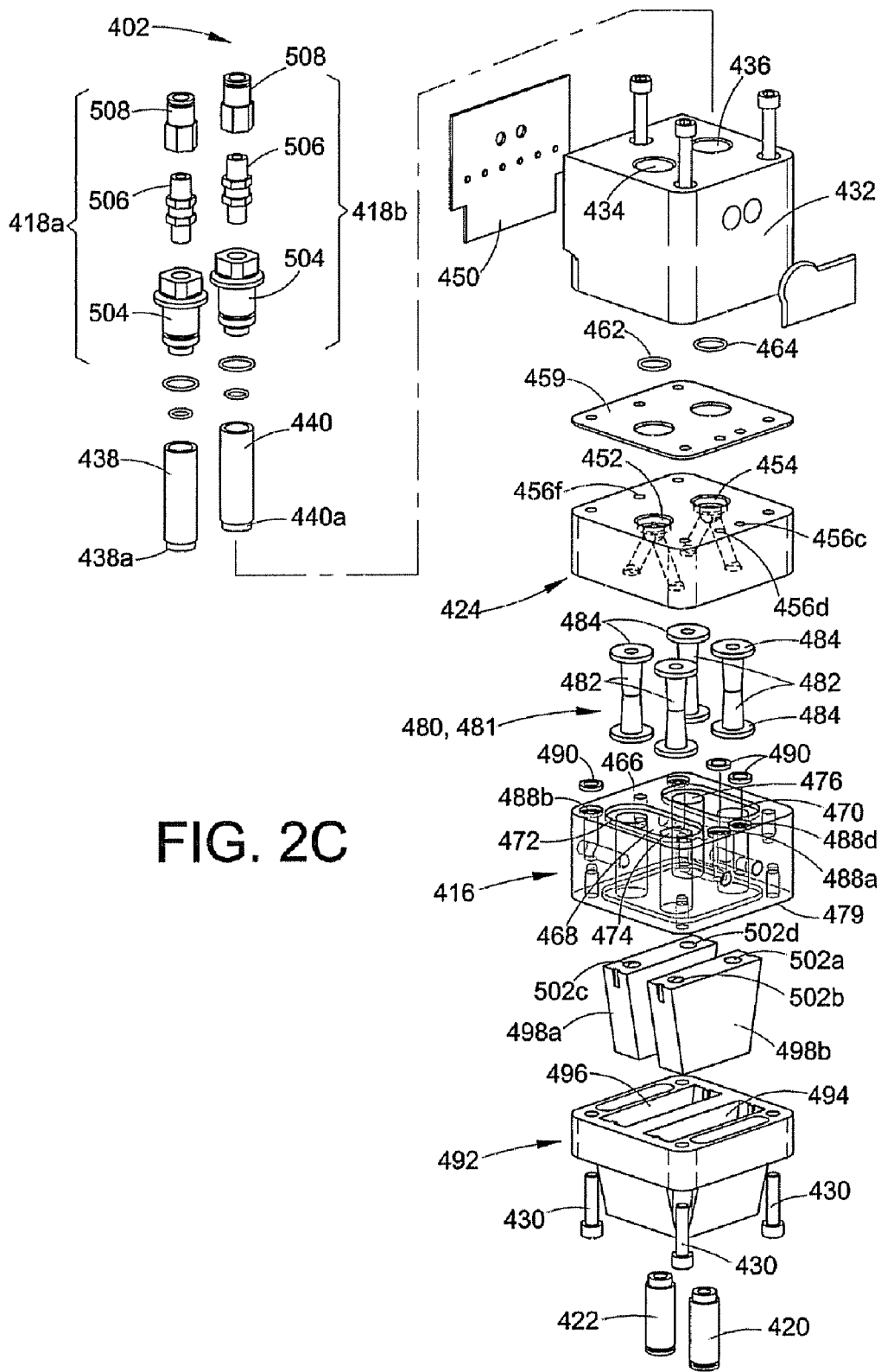
Figure 2E:
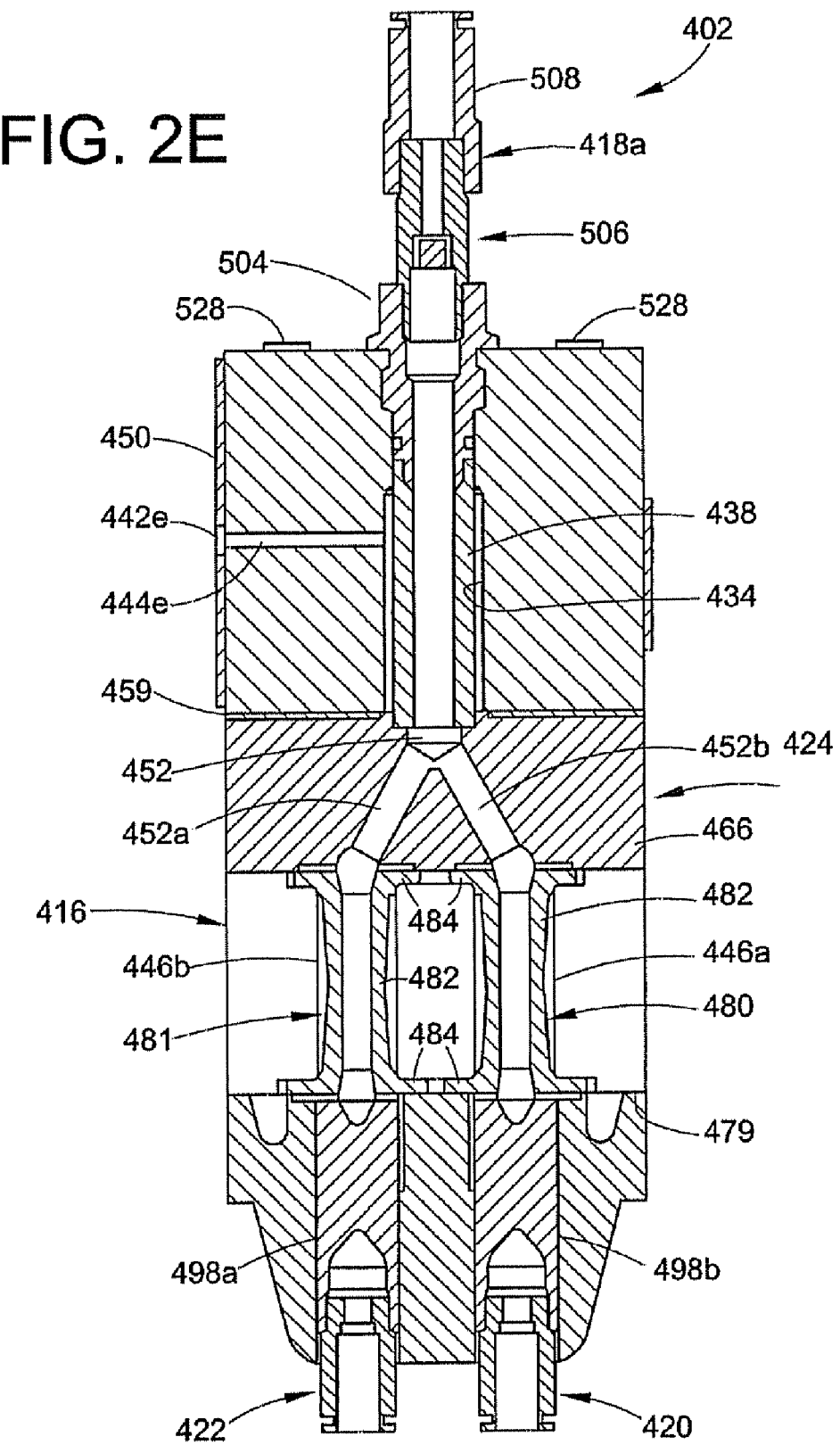
Figure 2F:
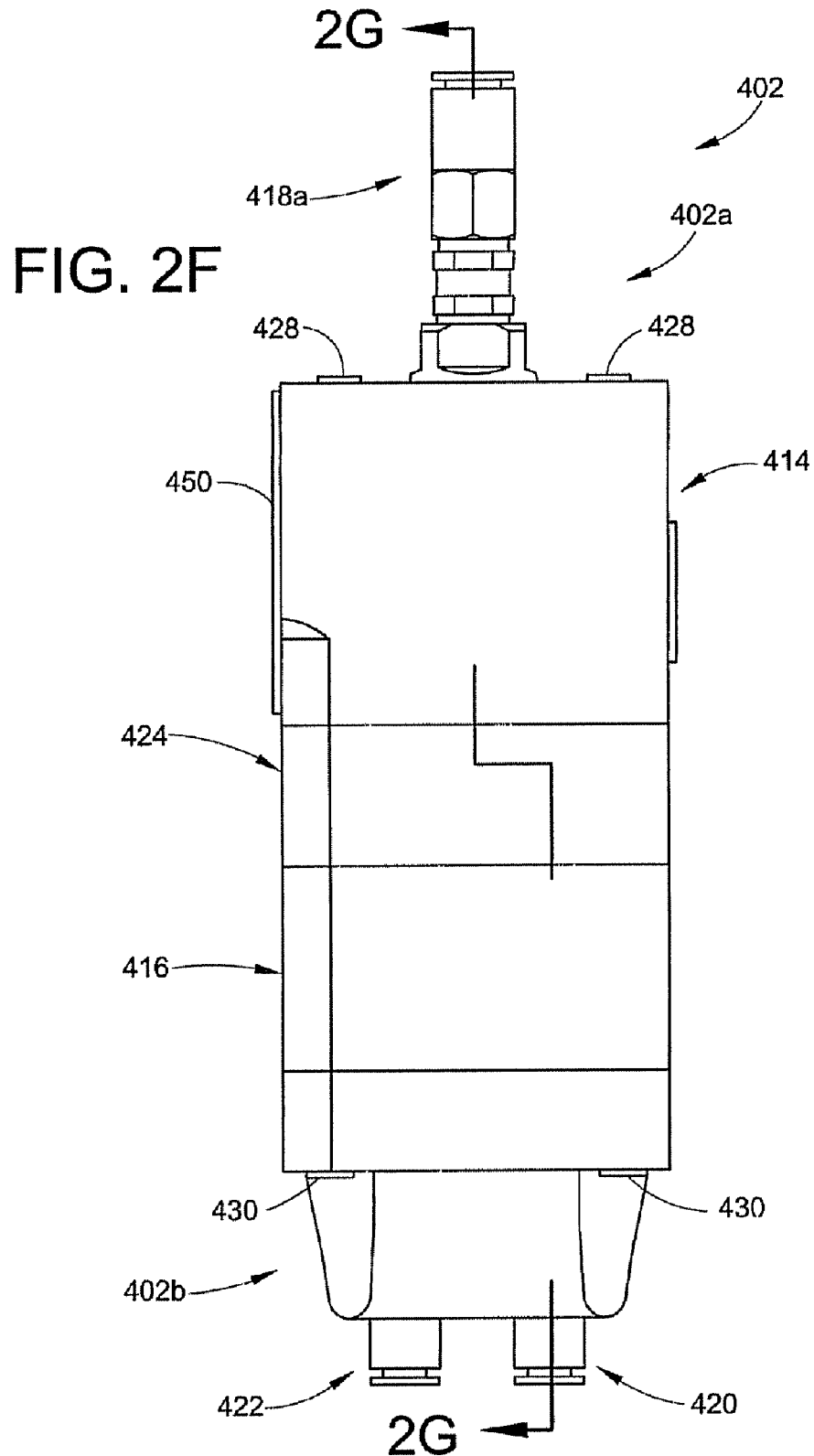
Figure 2G:
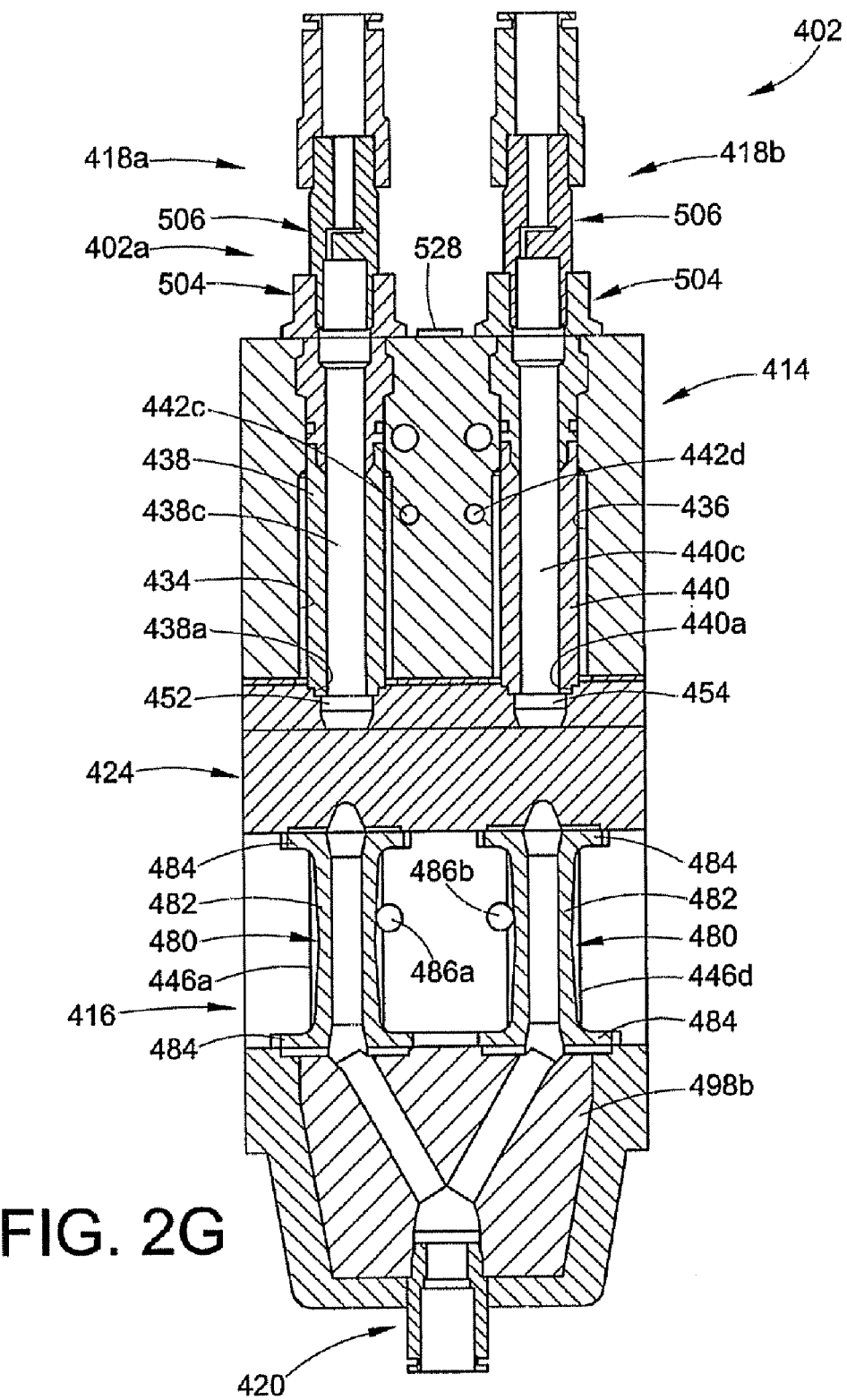
Figure 3A:
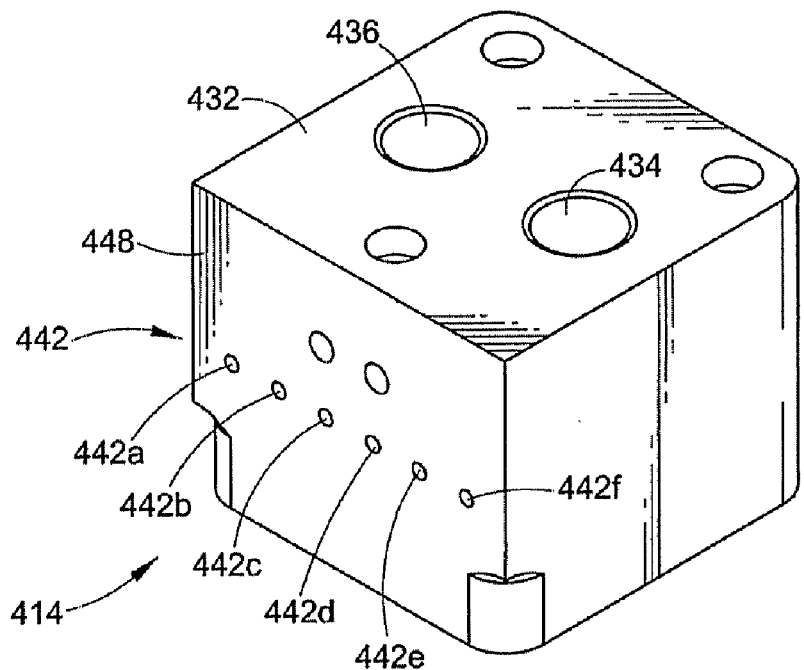
FIGS. 3A and 3B are an isometric and upper plan view of a pump manifold.
Figure 3B:
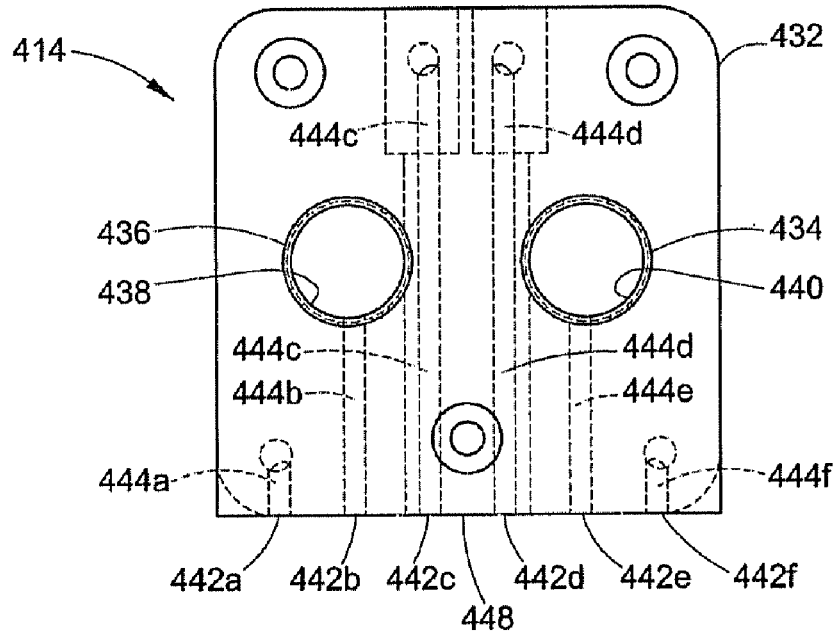

With reference to FIGS. 2A, 2B and 2C there is illustrated an exemplary embodiment of a dense phase pump 402. Although the pump 402 can be used as a transfer pump as well, it is particularly designed as a gun pump for supplying material to the spray applicators 20. The gun pumps 402 and transfer pumps 400 and 410 share many common design features which will be readily apparent from the detailed descriptions herein.

In accordance with one inventive aspect, the pump 402 is preferably although need not be modular in design. The modular construction of the pump 402 is realized with a pump manifold body 414 and a valve body 416. The manifold body 414 houses a pair of pump chambers along with a number of air passages as will be further explained herein. The valve body 416 houses a plurality of valve elements as will also be explained herein. The valves respond to air pressure signals that are communicated into the valve body 416 from the manifold body 414. Although the exemplary embodiments herein illustrate the use of pneumatic pinch valves, those skilled in the are will readily appreciate that various aspects and advantages of the present inventions may be realized with the use of other control valve designs other than pneumatic pinch valves.

The upper portion 402a of the pump is adapted for purge air arrangements 418a and 418b, and the lower portion 402b of the pump is adapted for a powder inlet hose connector 420 and a powder outlet hose connector 422. A powder feed hose 24 (FIG. 1) is connected to the inlet connector 420 to supply a flow of powder from a supply such as the feed hopper 22. A powder supply hose 406 (FIG. 1) is used to connect the outlet 422 to a spray applicator whether it be a manual or automatic spray gun positioned up at the spray booth 12. The powder supplied to the pump 402 may, but not necessarily must, be fluidized.

Powder flow into an out of the pump 402 thus occurs on a single end 402b of the pump. This allows a purge function 418 to be provided at the opposite end 402a of the pump thus providing an easier purging operation as will be further explained herein.

If there were only one pump chamber (which is a useable alternative embodiment) then the valve body 416 could be directly connected to the manifold because there would only be the need for two powder paths through the pump. However, in order to produce a steady, consistent and adjustable flow of powder from the pump, two or more pump chambers are provided. When two pump chambers are used, they are preferably operated out of phase so that as one chamber is receiving powder from the inlet the other is supplying powder to the outlet. In this way, powder flows substantially continuously from the pump. With a single chamber this would not be the case because there is a gap in the powder flow from each individual pump chamber due to the need to first fill the pump chamber with powder. When more than two chambers are used, their timing can be adjusted as needed. In any case it is preferred though not required that all pump chambers communicate with a single inlet and a single outlet.

In accordance with one inventive aspect, material flow into and out of each of the pump chambers is accomplished at a single end of the chamber. This provides an arrangement by which a straight through purge function can be used at an opposite end of the pump chamber. Since each pump chamber communicates with the same pump inlet and outlet in the exemplary embodiment, additional modular units are used to provide branched powder flow paths in the form of Y blocks.

A first Y-block 424 is interconnected between the manifold body 414 and the valve body 416. A second Y-block 426 forms the inlet/outlet end of the pump and is connected to the side of the valve body 416 that is opposite the first Y-block 424. A first set of bolts 428 are used to join the manifold body 414, first Y-block 424 and the valve body 416 together. A second set of bolts 430 are used to join the second Y-block 426 to the valve body 416. Thus the pump in FIG. 2A when fully assembled is very compact and sturdy, yet the lower Y-block 426 can easily and separately be removed for replacement of flow path wear parts without complete disassembly of the pump. The first Y-block 424 provides a two branch powder flow path away from each powder chamber. One branch from each chamber communicates with the pump inlet 420 through the valve body 416 and the other branch from each chamber communicates with the pump outlet 422 through the valve body 416. The second Y-block 426 is used to combine the common powder flow paths from the valve body 416 to the inlet 420 and outlet 422 of the pump. In this manner, each pump chamber communicates with the pump inlet through a control valve and with the pump outlet through another control valve. Thus, in the exemplary embodiment, there are four control valves in the valve body that control flow of powder into and out of the pump chambers.

The manifold body 414 is shown in detail in FIGS. 2B, 2E, 2G, 3A and 3B. The manifold 414 includes a body 432 having first and second bores therethrough 434, 436 respectively. Each of the bores receives a generally cylindrical gas permeable filter member 438 and 440 respectively. The gas permeable filter members 438, 440 include lower reduced outside diameter ends 438a and 440a which insert into a counterbore inside the first Y-block 424 (FIG. 4B) which helps to maintain the members 438, 440 aligned and stable. The upper ends of the filter members abut the bottom ends of purge air fittings 504 with appropriate seals as required. The filter members 438, 440 each define an interior volume (438c, 440c) that serves as a powder pump chamber so that there are two pump powder chambers provided in this embodiment. A portion of the bores 434, 436 are adapted to receive the purge air arrangements 418a and 418b as will be described hereinafter.

The filter members 438, 440 may be identical and allow a gas, such as ordinary air, to pass through the cylindrical wall of the member but not powder. The filter members 438, 440 may be made of porous polyethylene, for example. This material is commonly used for fluidizing plates in powder feed hoppers. An exemplary material has about a 40 micron opening size and about a 40-50% porosity. Such material is commercially available from Genpore or Poron. Other porous materials may be used as needed. The filter members 438, 440 each have a diameter that is less than the diameter of its associated bore 434, 436 so that a small annular space is provided between the wall of the bore and the wall of the filter member (see FIGS. 2E, 2G). This annular space serves as a pneumatic pressure chamber. When a pressure chamber has negative pressure applied to it, powder is drawn up into the powder pump chamber and when positive pressure is applied to the pressure chamber the powder in the powder pump chamber is forced out.

The manifold body 432 includes a series of six inlet orifices 442. These orifices 442 are used to input pneumatic energy or signals into the pump. Four of the orifices 442a, c, d and f are in fluid communication via respective air passages 444a, c, d and f with a respective pressure chamber 446 in the valve block 416 and thus are used to provide valve actuation air as will be explained hereinafter. Note that the air passages 444 extend horizontally from the manifold surface 448 into the manifold body and then extend vertically downward to the bottom surface of the manifold body where they communicate with respective vertical air passages through the upper Y-block 424 and the valve body 416 wherein they join to respective horizontal air passages in the valve body 416 to open into each respective valve pressure chamber. Air filters (not shown) may be included in these air passages to prevent powder from flowing up into the pump manifold 414 and the supply manifold 404 in the event that a valve element or other seal should become compromised. The remaining two orifices, 442b and 442e are respectively in fluid communication with the bores 434, 436 via air passages 444b and 444e. These orifices 442b and 442e are thus used to provide positive and negative pressure to the pump pressure chambers in the manifold body.

The orifices 442 are preferably, although need not be, formed in a single planar surface 448 of the manifold body. The air supply manifold 404 includes a corresponding set of orifices that align with the pump orifices 442 and are in fluid communication therewith when the supply manifold 404 is mounted on the pump manifold 414. In this manner the supply manifold 404 can supply all required pump air for the valves and pump chambers through a simple planar interface. A seal gasket 450 is compressed between the faces of the pump manifold 414 and the supply manifold 404 to provide fluid tight seals between the orifices. Because of the volume, pressure and velocity desired for purge air, preferably separate purge air connections are used between the supply manifold and the pump manifold. Although the planar interface between the two manifolds is preferred it is not required, and individual connections for each pneumatic input to the pump from the supply manifold 404 could be used as required. The planar interface allows for the supply manifold 404, which in some embodiments includes electrical solenoids, to be placed inside a cabinet with the pump on the outside of the cabinet (mounted to the supply manifold through an opening in a cabinet wall) so as to help isolate electrical energy from the overall system 10. It is noted in passing that the pump 402 need not be mounted in any particular orientation during use.

Figure 4A:
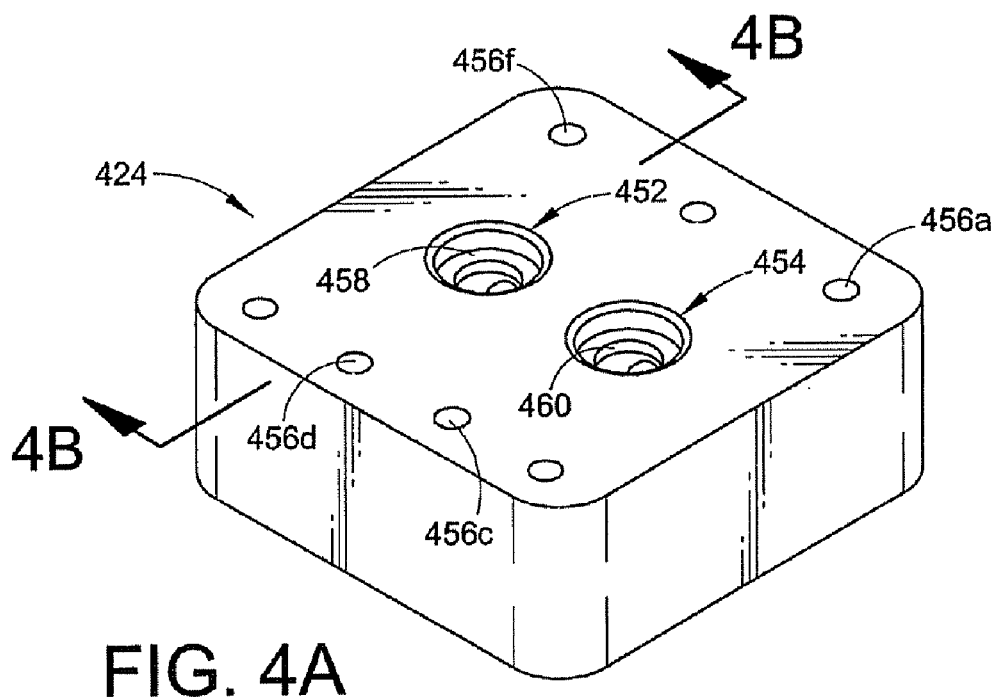
FIGS. 4A and 4B illustrate a first Y-block.
Figure 4B:
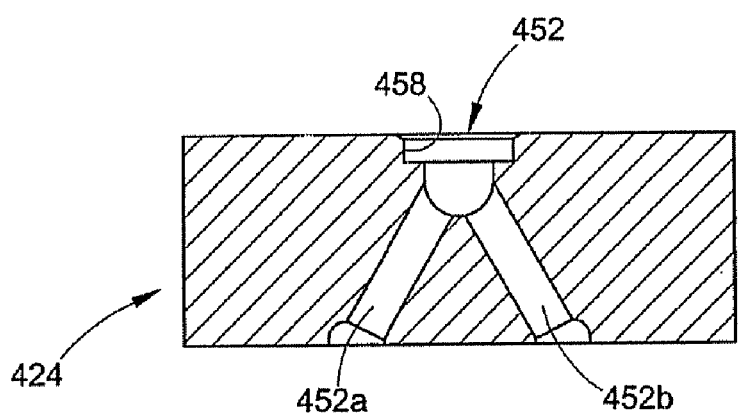

With reference to FIGS. 4A and 4B, the first Y-block 424 includes first and second ports 452, 454 that align with their respective pump chamber 434, 436. Each of the ports 452, 454 communicates with two branches 452a, 452b and 454a, 454b respectively (FIG. 4B only shows the branches for the port 452). Thus, the port 452 communicates with branches 452a and 452b. Therefore, there are a total of four branches in the first Y-block 424 wherein two of the branches communicate with one pressure chamber and the other two communicate with the other pressure chamber. The branches 452a, b and 454a, b form part of the powder path through the pump for the two pump chambers. Flow of powder through each of the four branches is controlled by a separate pinch valve in the valve body 416 as will be described herein. Note that the Y-block 424 also includes four through air passages 456a, c, d, f which are in fluid communication with the air passages 444a, c, d and f respectively in the manifold body 414. A gasket 459 may be used to provide fluid tight connection between the manifold body 414 and the first Y-block 424.

The ports 452 and 454 include counterbores 458, 460 which receive seals 462, 464 (FIG. 2C) such as conventional o-rings. These seals provide a fluid tight seal between the lower ends of the filter members 438, 440 and the Y-block ports 452, 454. They also allow for slight tolerance variations so that the filter members are tightly held in place.

Figure 5A:
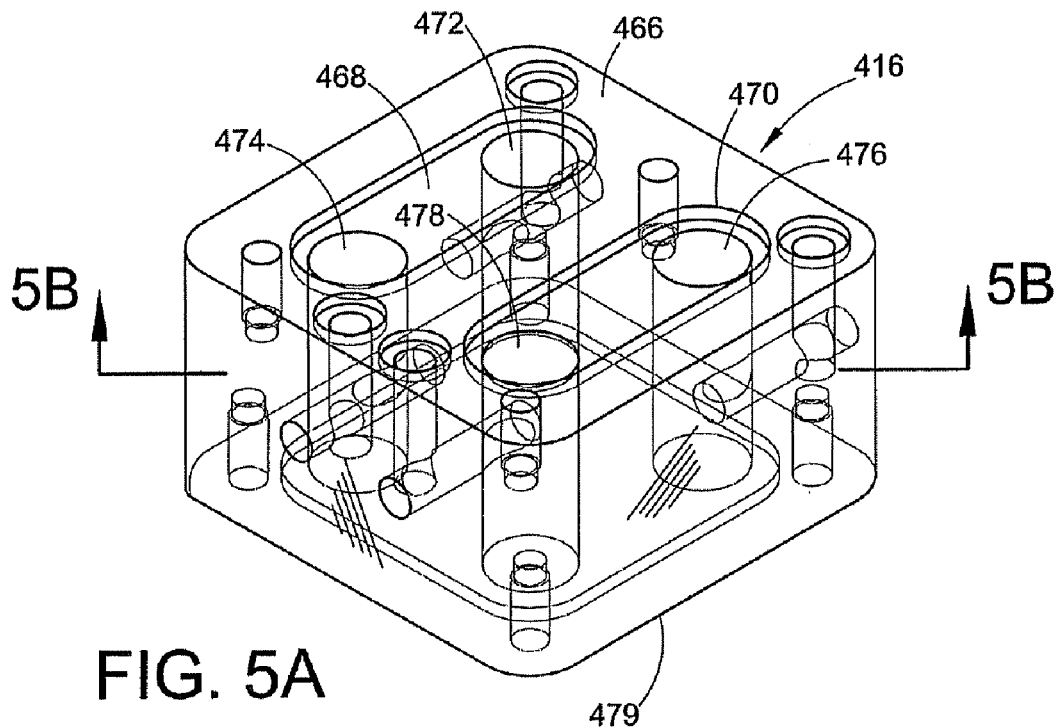
FIGS. 5A and 5B are perspective and cross-sectional views of a valve body.
Figure 5B:
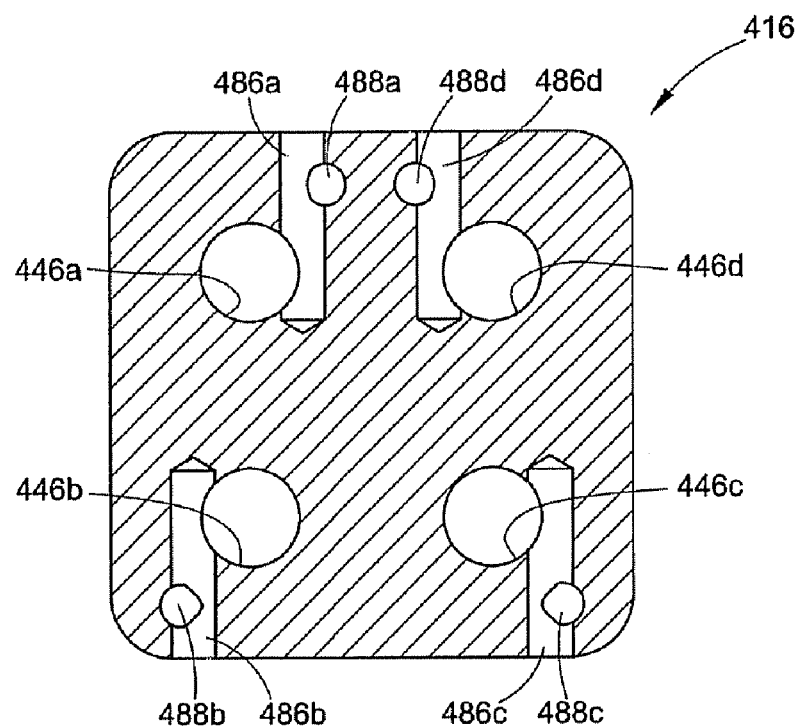

With additional reference to FIGS. 5A and 5B, the valve body 416 includes four through bores 446a, 446b, 446c and 446d that function as pressure chambers for a corresponding number of pinch valves. The upper surface 466 of the valve body includes two recessed regions 468 and 470 each of which includes two ports, each port being formed by one end of a respective bore 446. In this embodiment, the first recessed portion 468 includes orifices 472 and 474 which are formed by their respective bores 446b and 446a respectively. Likewise, the second recessed portion 470 includes orifices 476 and 478 which are formed by their respective bores 446d and 446c respectively. Corresponding orifices are formed on the opposite side face 479 of the valve body 416.

Each of the pressure chambers 446a-d retains either an inlet pinch valve element 480 or an outlet pinch valve 481. Each pinch valve element 480, 481 is a fairly soft flexible member made of a suitable material, such as for example, natural rubber, latex or silicone. Each valve element 480, 481 includes a central generally cylindrical body 482 and two flanged ends 484 of a wider diameter than the central body 482. The flanged ends function as seals and are compressed about the bores 446a-d when the valve body 416 is sandwiched between the first Y-block 424 and the second Y-block 426. In this manner, each pinch valve defines a flow path for powder through the valve body 416 to a respective one of the branches 452, 454 in the first Y-block 424. Therefore, one pair of pinch valves (a suction valve and a delivery valve) communicates with one of the pump chambers 440 in the manifold body while the other pair of pinch valves communicates with the other pump chamber 438. There are two pinch valves per chamber because one pinch valve controls the flow of powder into the pump chamber (suction) and the other pinch valve controls the flow of powder out of the pump chamber (delivery). The outer diameter of each pinch valve central body portion 482 is less than the bore diameter of its respect pressure chamber 446. This leaves an annular space surrounding each pinch valve that functions as the pressure chamber for that valve.

The valve body 416 includes air passages 486a-d that communicate respectively with the four pressure chamber bores 446a-d. as illustrated in FIG. 5B. These air passages 486a-d include vertical extensions (as viewed in FIG. 5B) 488a-d. These four air passage extensions 488a, b, c, d respectively are in fluid communication with the vertical portions of the four air passages 444d, f, a, c in the manifold 414 and the vertical passages 456 d, f, a, c in the upper Y-block 424. Seals 490 are provided for air tight connections.

In this manner, each of the pressure chambers 446 in the valve body 416 is in fluid communication with a respective one of the air orifices 442 in the manifold body 414, all through internal passages through the manifold body, the first Y-block and the valve body. When positive air pressure is received from the supply manifold 404 (FIG. 1) into the pump manifold 414, the corresponding valve 480, 481 is closed by the force of the air pressure acting against the outer flexible surface of the flexible valve body. The valves open due to their own resilience and elasticity when external air pressure in the pressure chamber is removed. This true pneumatic actuation avoids any mechanical actuation or other control member being used to open and close the pinch valves which is a significant improvement over the conventional designs. Each of the four pinch valves 480, 481 is preferably separately controlled for the gun pump 402.

In accordance with another aspect of the inventions, the valve body 416 is preferably made of a sufficiently transparent material so that an operator can visually observe the opening and closing of the pinch valves therein. A suitable material is acrylic but other transparent materials may be used. The ability to view the pinch valves also gives a good visual indication of a pinch valve failure since powder will be visible.

Figure 6A:
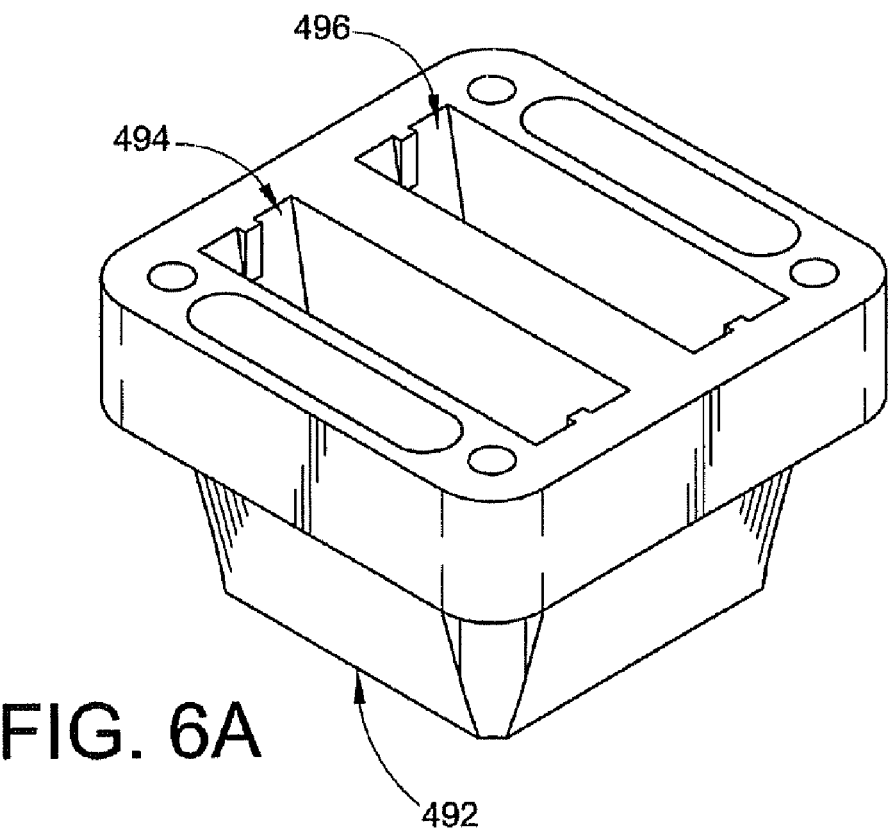
FIGS. 6A and 6B illustrate in perspective another Y-block arrangement.
Figure 6B:
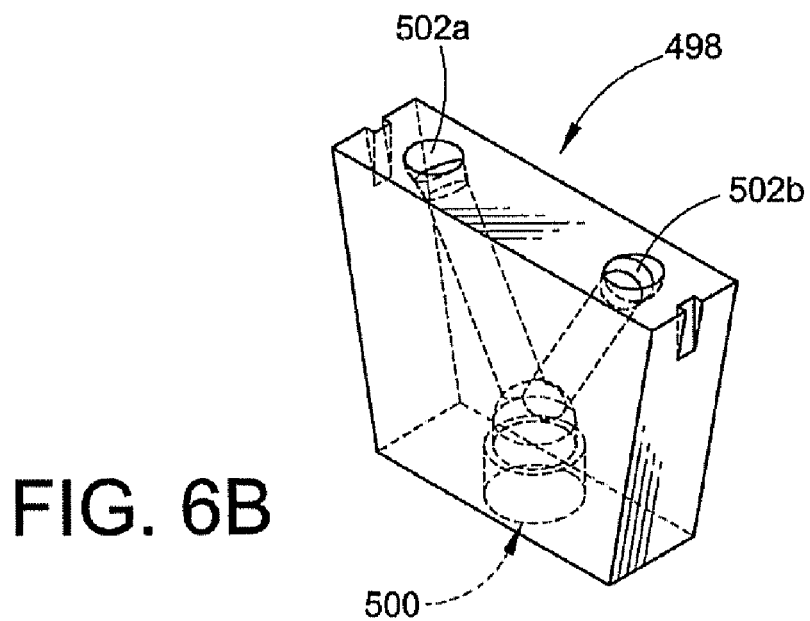

With additional reference to FIGS. 6A and 6B, the remaining part of the pump is the inlet end 402b formed by a second Y-block end body 492. The end body 492 includes first and second recesses 494, 496 each of which is adapted to receive a Y-block 498a and 498b. One of the Y-blocks is used for powder inlet and the other is used for powder outlet. Each Y-block 498 is a wear component due to exposure of its internal surfaces to powder flow. Since the body 492 is simply bolted to the valve body 416, it is a simple matter to replace the wear parts by removing the body 492, thus avoiding having to disassemble the rest of the pump.

Each Y-block 498 includes a lower port 500 that is adapted to receive a fitting or other suitable hose connector 420, 422 (FIG. 2A) with one fitting connected to a hose 24 that runs to a powder supply and another hose 406 to a spray applicator such as a spray gun 20 (FIG. 1). Each Y-block includes two powder path branches 502a, 502b, 502c and 502d that extend away from the port 500. Each powder path in the second Y-blocks 498 are in fluid communication with a respective one of the pinch valves 480, 481 in the pinch valve body 416. Thus, powder that enters the pump at the inlet 420 branches through a first of the two lower Y-blocks 498 into two of the pinch valves and from there to the pump chambers. Likewise powder from the two pump chambers recombine from the other two pinch valves into a single outlet 422 by way of the other lower Y-block 498.

The powder flow paths are as follows. Powder enters through a common inlet 420 and branches via paths 502*a* or 502*b* in the lower Y-block 498*b* to the two inlet or suction pinch valves 480. Each of the inlet pinch valves 480 is connected to a respective one of the powder pump chambers 434, 436 via a respective one branch 452, 454 of a respective path through the first or upper Y-block 424. Each of the other branches 452, 454 of the upper Y-block 424 receive powder from a respective pump chamber, with the powder flowing through the first Y-block 424 to the two outlet or delivery pinch valves 481. Each of the outlet pinch valves 481 is also connected to a respect one of the branches 502 in the lower Y-block 498*a* wherein the powder from both pump chambers is recombined to the single outlet 422.

The pneumatic flow paths are as follows. When any of the pinch valves is to be closed, the supply manifold 404 issues a pressure increase at the respective orifice 442 in the manifold body 414. The increased air pressure flows through the respective air passage 442, 444 in the manifold body 414, down through the respective air passage 456 in the first Y-block 424 and into the respective air passage 486 in the valve body 416 to the appropriate pressure chamber 446.

It should be noted that a pump in accordance with the present inventions provides for a proportional flow valve based on percent fill of the powder pump chambers, meaning that the flow rate of powder from the pump can be accurately controlled by controlling the open time of the pinch valves that feed powder to the pump chambers. This allows the pump cycle (i.e. the total time duration for filling and emptying the pump chambers) to be short enough so that a smooth flow of powder is achieved independent of the flow rate, with the flow rate being separately controlled by operation of the pinch valves. Thus, flow rate can be adjusted entirely by control of the pinch valves without having to make any physical changes to the pump.

The purge function is greatly simplified in accordance with another inventive aspect. Because the pump design provides a way for powder to enter and exit the pump chambers from a single end, the opposite end of the pump chamber can be used for purge air. With reference to FIGS. 2A, 2C, 2E and 2G, a purge air fitting 504 is inserted into the upper end of its respective pump chamber 438, 440. The fittings 504 receive respective check valves 506 that are arranged to only permit flow into the pump chambers 438, 440. The check valves 506 receive respective purge air hose fittings 508 to which a purge air hose can be connected. Purge air is supplied to the pump from the supply manifold 404 as will be described hereinbelow. The purge air thus can flow straight through the powder pump chambers and through the rest of the powder path inside the pump to very effectively purge the pump for a color change operation. No special connections or changes need to be made by the operator to effect this purging operation, thereby reducing cleaning time. Once the system 10 is installed, the purging function is always connected and available, thereby significantly reducing color change time because the purging function can be executed by the control system 39 without the operator having to make or break any powder or pneumatic connections with the pump.

Note from FIGS. 1 and 2A that with all four pinch valves 480, 481 in an open condition purge air will flow straight through the pump chambers, through the powder paths in the first Y-block 424, the pinch valves themselves 480, 481, the second Y-block 498 and out both the inlet 420 and the outlet 422. Purge air thus can be supplied throughout the pump and then on to the spray applicator to purge that device as well as to purge the feed hoses back to the powder supply 22. Thus in accordance with another inventive aspect, a dense phase pump concept is provided that allows forward and reverse purging.

Figure 7:
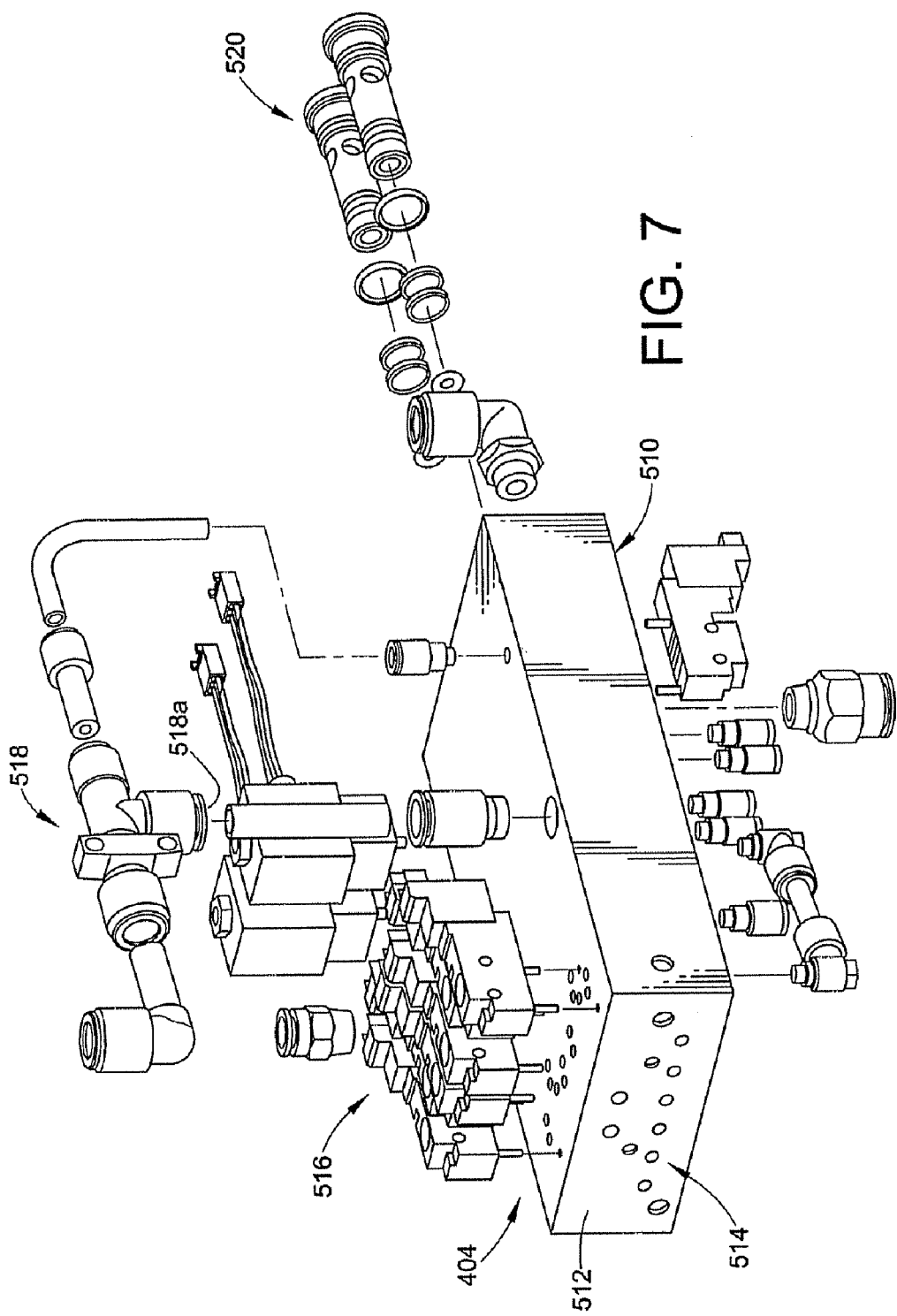
FIG. 7 is an exploded perspective of a supply manifold.

With reference to FIG. 7, the supply manifold 404 illustrated is in essence a series of solenoid valves and air sources that control the flow of air to the pump 402. The particular arrangement illustrated in FIG. 7 is exemplary and not intended to be limiting. The supply of air to operate the pump 402 can be done without a manifold arrangement and in a wide variety of ways. The embodiment of FIG. 7 is provided as it is particularly useful for the planar interface arrangement with the pump, however, other manifold designs can also be used.

The supply manifold 404 includes a supply manifold body 510 that has a first planar face 512 that is mounted against the surface 448 of the pump manifold body 414 (FIG. 3A) as previously described herein. Thus the face 512 includes six orifices 514 that align with their respective orifices 442 in the pump manifold 414. The supply manifold body 510 is machined to have the appropriate number and location of air passages therein so that the proper air signals are delivered to the orifices 514 at the correct times. As such, the manifold further includes a series of valves that are used to control the flow of air to the orifices 514 as well as to control the purge air flow. Negative pressure is generated in the manifold 404 by use of a conventional venturi pump 518. System or shop air is provided to the manifold 404 via appropriate fittings 520. The details of the physical manifold arrangement are not necessary to understand and practice the present inventions since the manifold simply operates to provide air passages for air sources to operate the pump and can be implemented in a wide variety of ways. Rather, the details of note are described in the context of a schematic diagram of the pneumatic flow. It is noted at this time, however, that in accordance with another inventive aspect, a separate control valve is provided for each of the pinch valves in the valve body 414 for purposes that will be described hereinafter.

Figure 8:
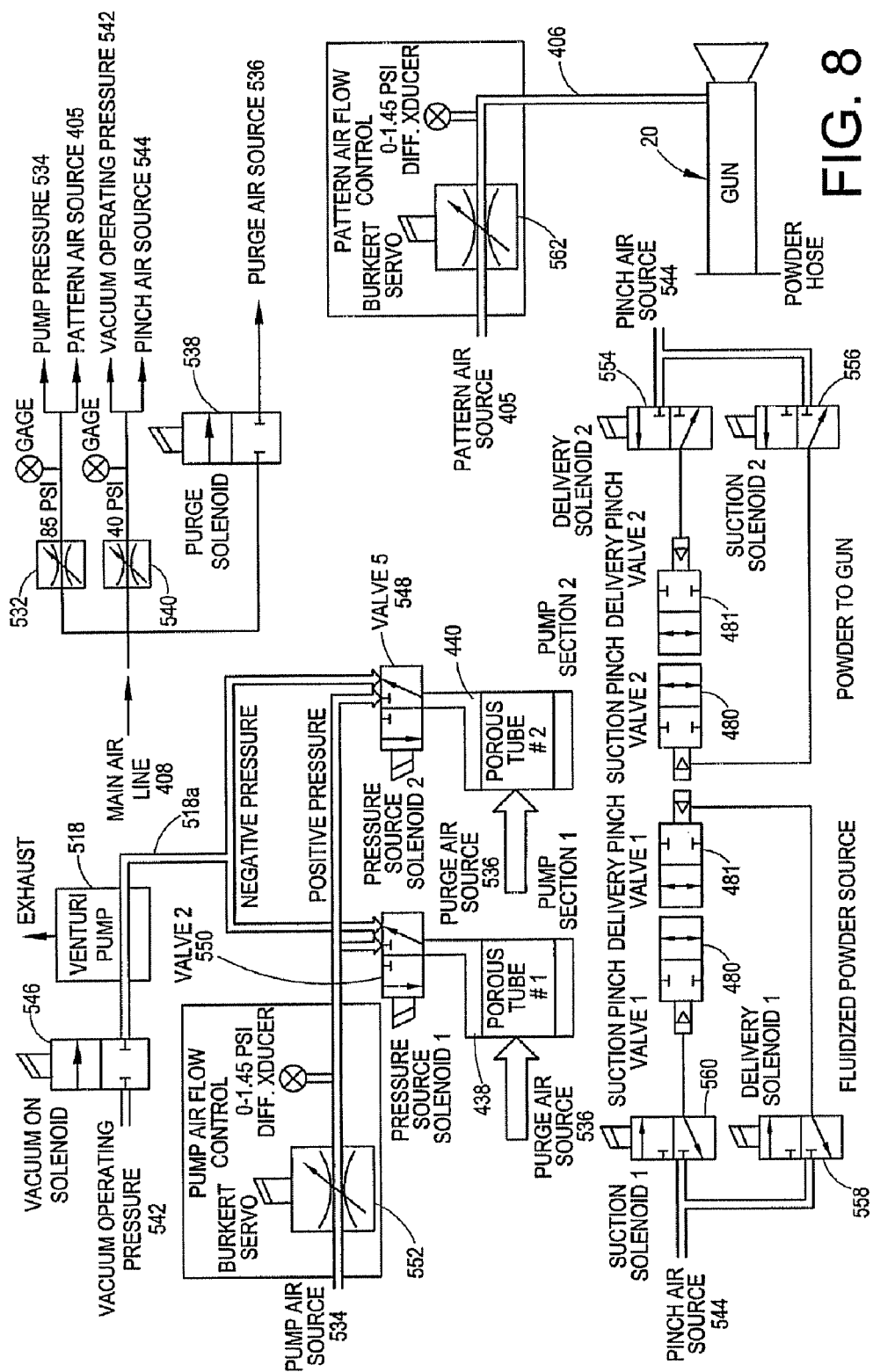
FIG. 8 is an exemplary embodiment of a pneumatic flow arrangement for the pump of FIG. 2A.

With reference to FIG. 8, a pneumatic diagram is provided for a first embodiment of one aspect of the invention. Main air 408 enters the supply manifold 404 and goes to a first regulator 532 to provide pump pressure source 534 to the pump chambers 438, 440, as well as pattern shaping air source 405 to the spray applicator 20 via air hose 406. Main air also is used as purge air source 536 under control of a purge air solenoid valve 538. Main air also goes to a second regulator 540 to produce venturi air pressure source 542 used to operate the venturi pump (to produce the negative pressure to the pump chambers 438, 440) and also to produce pinch air source 544 to operate the pinch valves 480, 481.

In accordance with another aspect of the invention, the use of the solenoid control valve 538 or other suitable control device for the purge air provides multiple purge capability. The first aspect is that two or more different purge air pressures and flows can be selected, thus allowing a soft and hard purge function. Other control arrangements besides a solenoid valve can be used to provide two or more purge air flow characteristics. The control system 39 selects soft or hard purge, or a manual input could be used for this selection. For a soft purge function, a lower purge air flow is supplied through the supply manifold 404 into the pump pressure chambers 434, 436 which is the annular space between the porous members 438, 440 and their respective bores 434, 436. The control system 39 further selects one set of pinch valves (suction or delivery) to open while the other set is closed. The purge air bleeds through the porous filters 438, 440 and out the open valves to either purge the system forward to the spray gun 20 or reverse (backward) to the supply 22. The control system 39 then reverses which pinch valves are open and closed. Soft purge may also be done in both directions at the same time by opening all four pinch valves. Similarly, higher purge air pressure and flow may be used for a hard purge function forward, reverse or at the same time. The purge function carried out by bleeding air through the porous members 438, 440 also helps to remove powder that has been trapped by the porous members, thus extending the useful life of the porous members before they need to be replaced.

Hard or system purge can also be effected using the two purge arrangements 418*a* and 418*b*. High pressure flow air can be input through the purge air fittings 508 (the purge air can be provided from the supply manifold 404) and this air flows straight through the powder pump chambers defined in part by the porous members 438, 440 and out the pump. Again, the pinch valves 480, 481 can be selectively operated as desired to purge forward or reverse or at the same time.

It should be noted that the ability to optionally purge in only the forward or reverse direction provides a better purging capability because if purging can only be done in both directions at the same time, the purge air will flow through the path of least resistance whereby some of the powder path regions may not get adequately purged. For example, when trying the purge a spray applicator and a supply hopper, if the applicator is completely open to air flow, the purge air will tend to flow out the applicator and might not adequately purge the hopper or supply.

The present disclosure thus provides a pump design by which the entire powder path from the supply to and through the spray guns can be purged separately or at the same time with virtually no operator action required. The optional soft purge may be useful to gently blow out residue powder from the flow path before hitting the powder path with hard purge air, thereby preventing impact fusion or other deleterious effects from a hard purge being performed first.

The positive air pressure 542 for the venturi enters a control solenoid valve 546 and from there goes to the venturi pump 518. The output 518*a* of the venturi pump is a negative pressure or partial vacuum that is connected to an inlet of two pump solenoid valves 548, 550. The pump valves 548 and 550 are used to control whether positive or negative pressure is applied to the pump chambers 438, 440. Additional inputs of the valves 548, 550 receive positive pressure air from a first servo valve 552 that receives pump pressure air 534. The outlets of the pump valves 548, 550 are connected to a respective one of the pump chambers through the air passage scheme described hereinabove. Note that the purge air 536 is schematically indicated as passing through the porous tubes 438, 440.

Thus, the pump valves 550 and 548 are used to control operation of the pump 402 by alternately applying positive and negative pressure to the pump chambers, typically 180° out of phase so that as one chamber is being pressurized the other is under negative pressure and vice-versa. In this manner, one chamber is filling with powder while the other chamber is emptying. It should be noted that the pump chambers may or may not completely "fill" with powder. As will be explained herein, very low powder flow rates can be accurately controlled using the present invention by use of the independent control valves for the pinch valves. That is, the pinch valves can be independently controlled apart from the cycle rate of the pump chambers to feed more or less powder into the chambers during each pumping cycle.

Pinch valve air 544 is input to four pinch valve control solenoids 554, 556, 558 and 560. Four valves are used so that there is preferably independent timing control of the operation of each of the four pinch valves 480, 481. In FIG. 8, "delivery pinch valve" refers to those two pinch valves 481 through which powder exits the pump chambers and "suction pinch valve" refers to those two pinch valves 480 through which powder is fed to the pump chambers. Though the same reference numeral is used, each suction pinch valve and each delivery pinch valve is separately controlled.

A first delivery solenoid valve 554 controls air pressure to a first delivery pinch valve 481; a second delivery solenoid valve 558 controls air pressure to a second delivery pinch valve 481; a first suction solenoid valve 556 controls air pressure to a first suction pinch valve 480 and a second suction solenoid valve 560 controls air pressure to a second suction pinch valve 480.

The pneumatic diagram of FIG. 8 thus illustrates the functional air flow that the manifold 404 produces in response to various control signals from the control system 39 (FIG. 1).

Figure 9A:
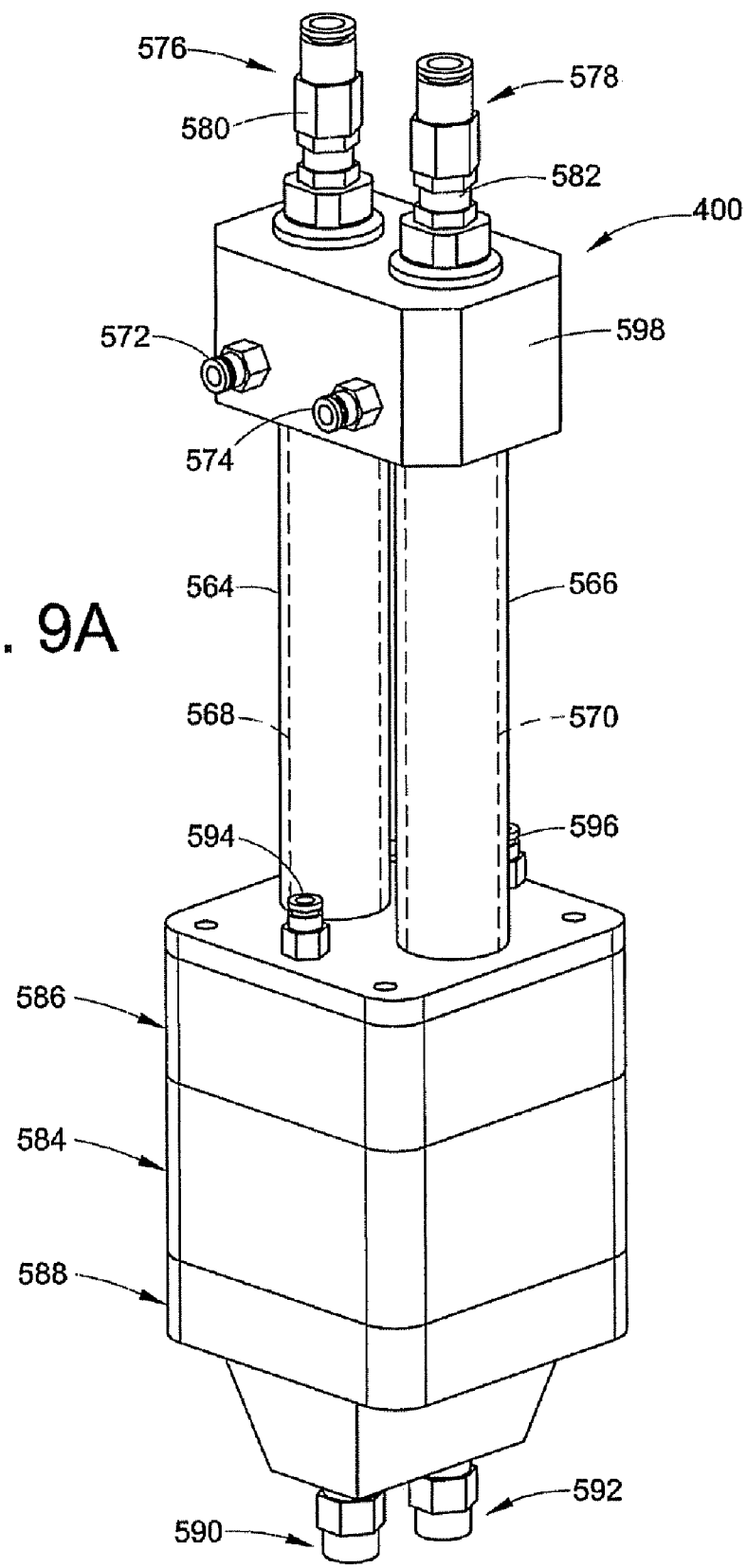
FIGS. 9A and 9B are an isometric and exploded isometric of a transfer pump in accordance with the invention.
Figure 9B:
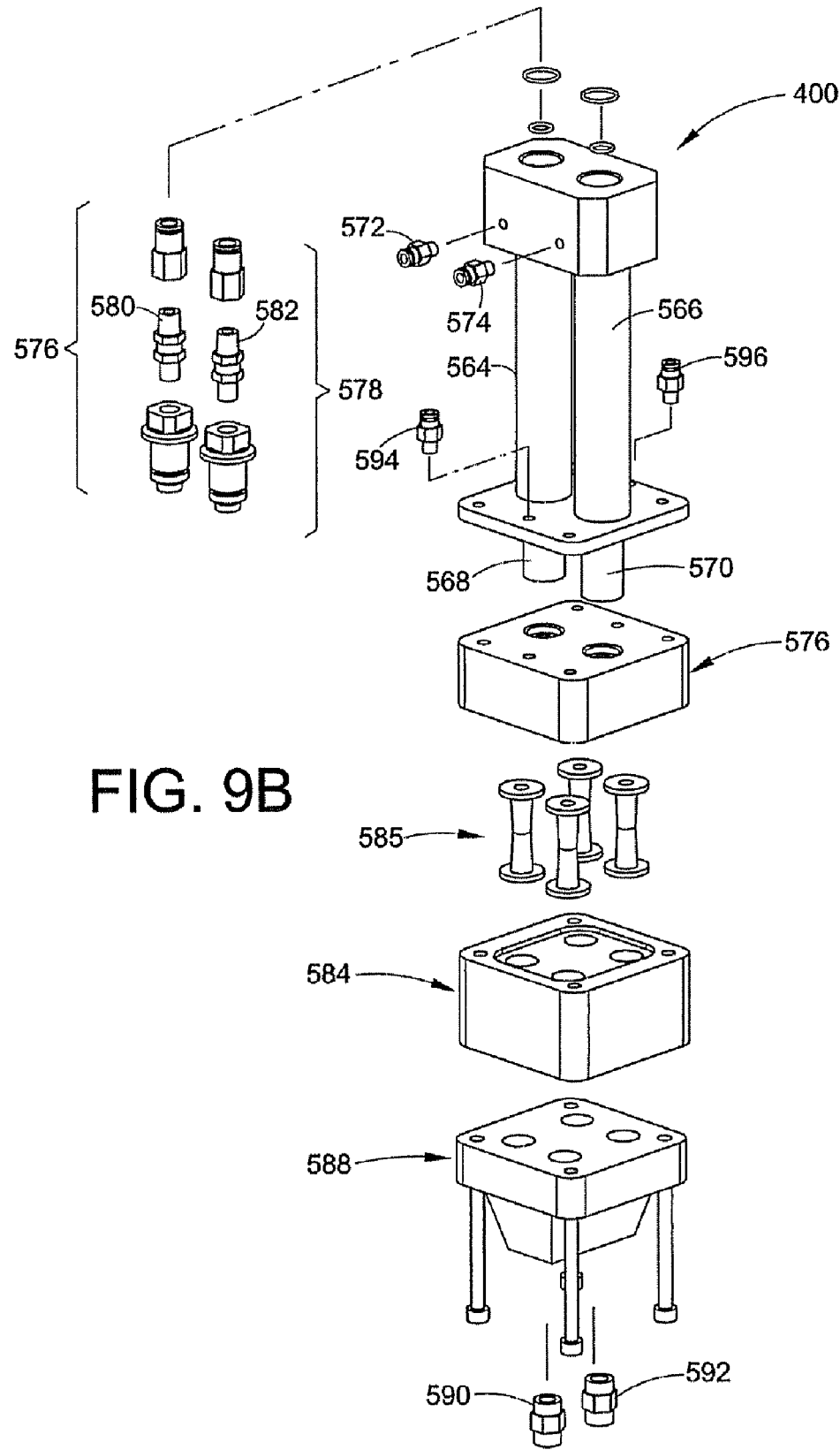

With reference to FIGS. 9A and 9B, and in accordance with another inventive aspect, a transfer pump 400 is also contemplated. Many aspects of the transfer pump are the same or similar to the spray applicator pump 402 and therefore need not be repeated in detail.

Although a gun pump 402 may be used as a transfer pump as well, a transfer pump is primarily used for moving larger amounts of powder between receptacles as quickly as needed. Moreover, although a transfer pump as described herein will not have the same four way independent pinch valve operation, a transfer valve may be operated with the same control process as the gun pump. For example, some applications require large amounts of material to be applied over large surfaces yet maintaining control of the finish. A transfer pump could be used as a pump for the applicators by also incorporating the four independent pinch valve control process described herein.

In the system of FIG. 1 a transfer pump 400 is used to move powder from the recovery system 28 (such as a cyclone) back to the feed center 22. A transfer pump 410 is also used to transfer virgin powder from a supply, such as a box, to the feed center 22. In such examples as well as others, the flow characteristics are not as important in a transfer pump because the powder flow is not being sent to a spray applicator. In accordance then with an aspect of the invention, the gun pump is modified to accommodate the performance expectations for a transfer pump.

In the transfer pump 400, to increase the powder flow rate larger pump chambers are needed. In the embodiment of FIGS. 9A and 9B, the pump manifold is now replaced with two extended tubular housings 564 and 566 which enclose lengthened porous tubes 568 and 570. The longer tubes 568, 570 can accommodate a greater amount of powder during each pump cycle. The porous tubes 568, 570 have a slightly smaller diameter than the housings 564, 566 so that an annular space is provided therebetween that serves as a pressure chamber for both positive and negative pressure. Air hose fittings 572 and 574 are provided to connect air hoses that are also connected to a source of positive and negative pressure at a transfer pump air supply system to be described hereinafter. Since a pump manifold is not being used, the pneumatic energy is individually plumbed into the pump 400.

The air hose fittings 572 and 574 are in fluid communication with the pressure chambers within the respective housings 564 and 566. In this manner, powder is drawn into and pushed out of the powder chambers 568, 570 by negative and positive pressure as in the gun pump design. Also similarly, purge port arrangements 576 and 578 are provided and function the same way as in the gun pump design, including check valves 580, 582.

A valve body 584 is provided that houses four pinch valves 585 which control the flow of powder into and out of the pump chambers 568 and 570 as in the gun pump design. As in the gun pump, the pinch valves are disposed in respective pressure chambers in the valve body 584 such that positive air pressure is used to close a valve and the valves open under their own resilience when the positive pressure is removed. A different pinch valve actuation scheme however is used as will be described shortly. An upper Y-block 586 and a lower Y-block 588 are also provided to provide branched powder flow paths as in the gun pump design. The lower Y-block 588 thus is also in communication with a powder inlet fitting 590 and a powder outlet fitting 592. Thus, powder in from the single inlet flows to both pump chambers 568, 570 through respective pinch valves and the upper Y-block 586, and powder out of the pump chambers 568, 570 flows through respective pinch valves to the single outlet 592. The branched powder flow paths are realized in a manner similar to the gun pump embodiment and need not be repeated herein. The transfer pump may also incorporate replaceable wear parts or inserts in the lower Y-block 588 as in the gun pump.

Again, since a pump manifold is not being used in the transfer pump, separate air inlets 594 and 596 are provided for operation of the pinch valves which are disposed in pressure chambers as in the gun pump design. Only two air inlets are needed even though there are four pinch valves for reasons set forth below. An end cap 598 may be used to hold the housings in alignment and provide a structure for the air fittings and purge fittings.

Because quantity of flow is of greater interest in the transfer pump than quality of the powder flow, individual control of all four pinch valves is not needed although it could alternatively be done. As such, pairs of the pinch valves can be actuated at the same time, coincident with the pump cycle rate. In other words, when the one pump chamber is filling with powder, the other is discharging powder, and respective pairs of the pinch valves are thus open and closed. The pinch valves can be actuated synchronously with actuation of positive and negative pressure to the pump chambers. Moreover, single air inlets to the pinch valve pressure chambers can be used by internally connecting respective pairs of the pressure chambers for the pinch valve pairs that operate together. Thus, two pinch valves are used as delivery valves for powder leaving the pump, and two pinch valves are used as suction valves for powder being drawing into the pump. However, because the pump chambers alternate delivery and suction, during each half cycle there is one suction pinch valve open and one delivery pinch valve open, each connected to different ones of the pump chambers. Therefore, internally the valve body 584 the pressure chamber of one of the suction pinch valves and the pressure chamber for one of the delivery pinch valves are connected together, and the pressure chambers of the other two pinch valves are also connected together. This is done for pinch valve pairs in which each pinch valve is connected to a different pump chamber. The interconnection can be accomplished by simply providing cross-passages within the valve body between the pair of pressure chambers.

Figure 10:
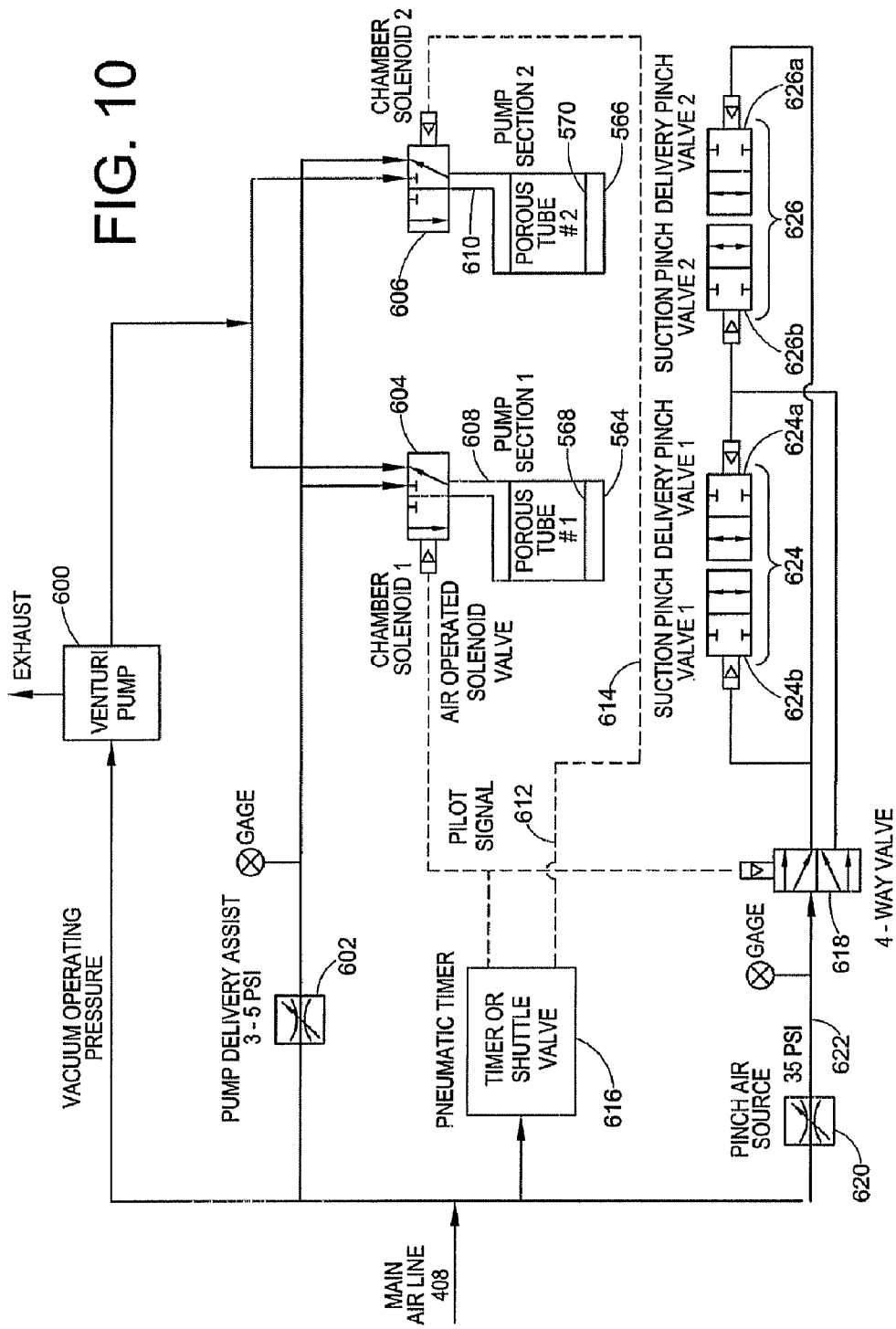
FIG. 10 is an exemplary embodiment of a pneumatic flow arrangement for a transfer pump.

With reference to FIG. 10, the exemplary pneumatic diagram for the transfer pump 400 is somewhat more simplified than for a pump that is used with a spray applicator. Main air 408 is input to a venturi pump 600 that is used to produce negative pressure for the transfer pump chambers. Main air also is input to a regulator 602 with delivery air being supplied to respective inputs to first and second chamber solenoid valves 604, 606. The chamber valves also receive as an input the negative pressure from the venturi pump 600. The solenoid valves 604, 606 have respective outputs 608, 610 that are in fluid communication with the respective pressure chambers of the transfer pump.

The solenoid valves in this embodiment are air actuated rather than electrically actuated. Thus, air signals 612 and 614 from a pneumatic timer or shuttle valve 616 are used to alternate the valves 604, 606 between positive and negative pressure outputs to the pressure chambers of the pump. An example of a suitable pneumatic timer or shuttle valve is model S9 568/68-1/4-SO available from Hoerbiger-Origa. As in the gun pump, the pump chambers alternate such that as one is filling the other is discharging. The shuttle timer signal 612 is also used to actuate a 4-way valve 618. Main air is reduced to a lower pressure by a regulator 620 to produce pinch air 622 for the transfer pump pinch valves. The pinch air 622 is delivered to the 4-way valve 618. The pinch air is coupled to the pinch valves 624 for the one pump chamber and 626 for the other pump chamber such that associated pairs are open and closed together during the same cycle times as the pump chambers. For example, when the delivery pinch valve 624*a* is open to the one pump chamber, the delivery pinch valve 626*a* for the other pump chamber is closed, while the suction pinch valve 624*b* is closed and the suction pinch valve 626*b* is open. The valves reverse during the second half of each pump cycle so that the pump chambers alternate as with the gun pump. Since the pinch valves operate on the same timing cycle as the pump chambers, a continuous flow of powder is achieved.

Figure 11:
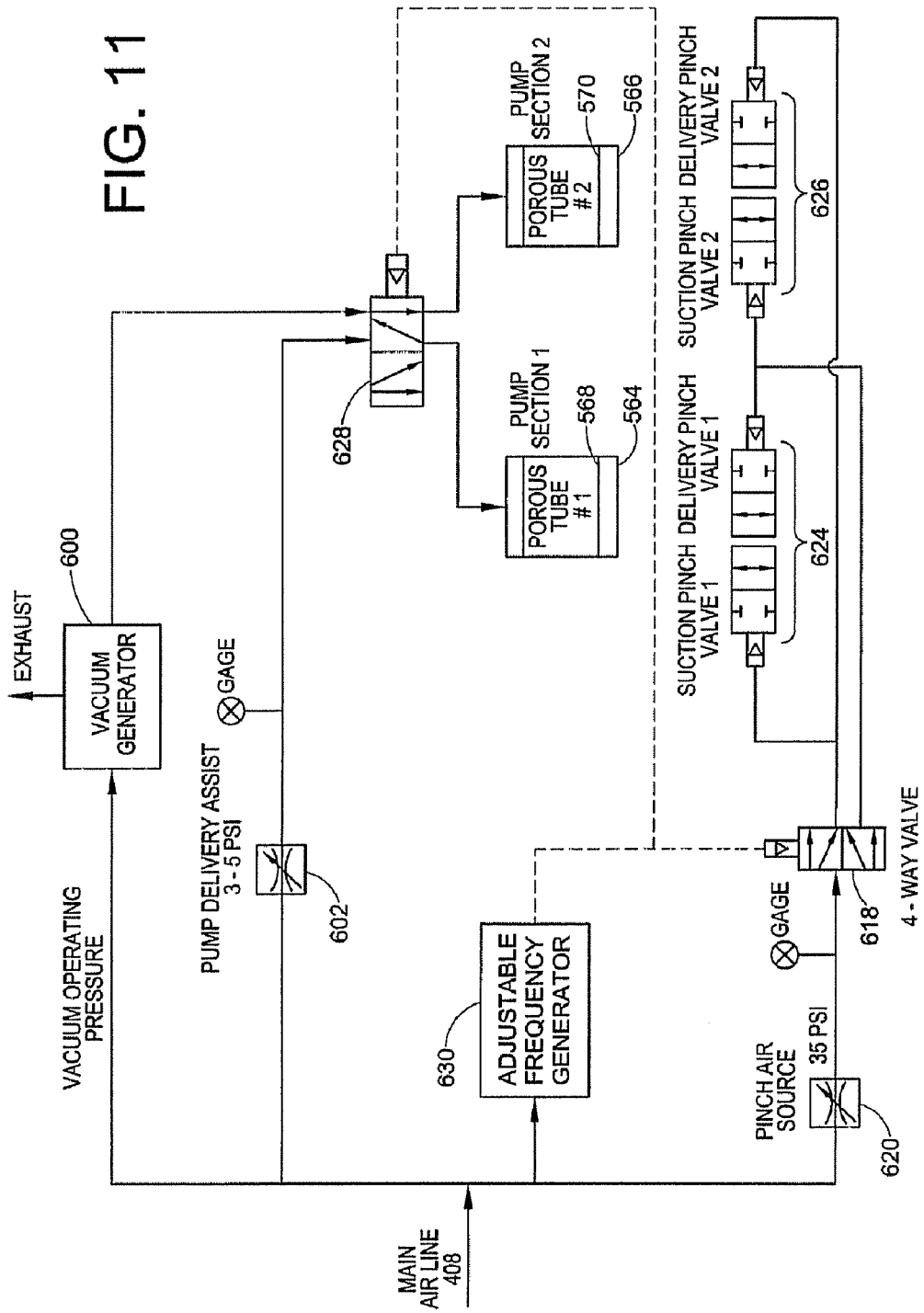
FIG. 11 is an alternative embodiment of a pneumatic circuit for the transfer pump.

FIG. 11 illustrates an alternative embodiment of the transfer pump pneumatic circuit. In this embodiment, the basic operation of the pump is the same, however, now a single valve 628 is used to alternate positive and negative pressure to the pump chambers. In this case, a pneumatic frequency generator 630 is used. A suitable device is model 81 506 490 available from Crouzet. The generator 630 produces a varying air signal that actuates the chamber 4-way valve 628 and the pinch air 4-way valve 618. As such, the alternating cycles of the pump chambers and the associated pinch valves is accomplished.

Figure 12:
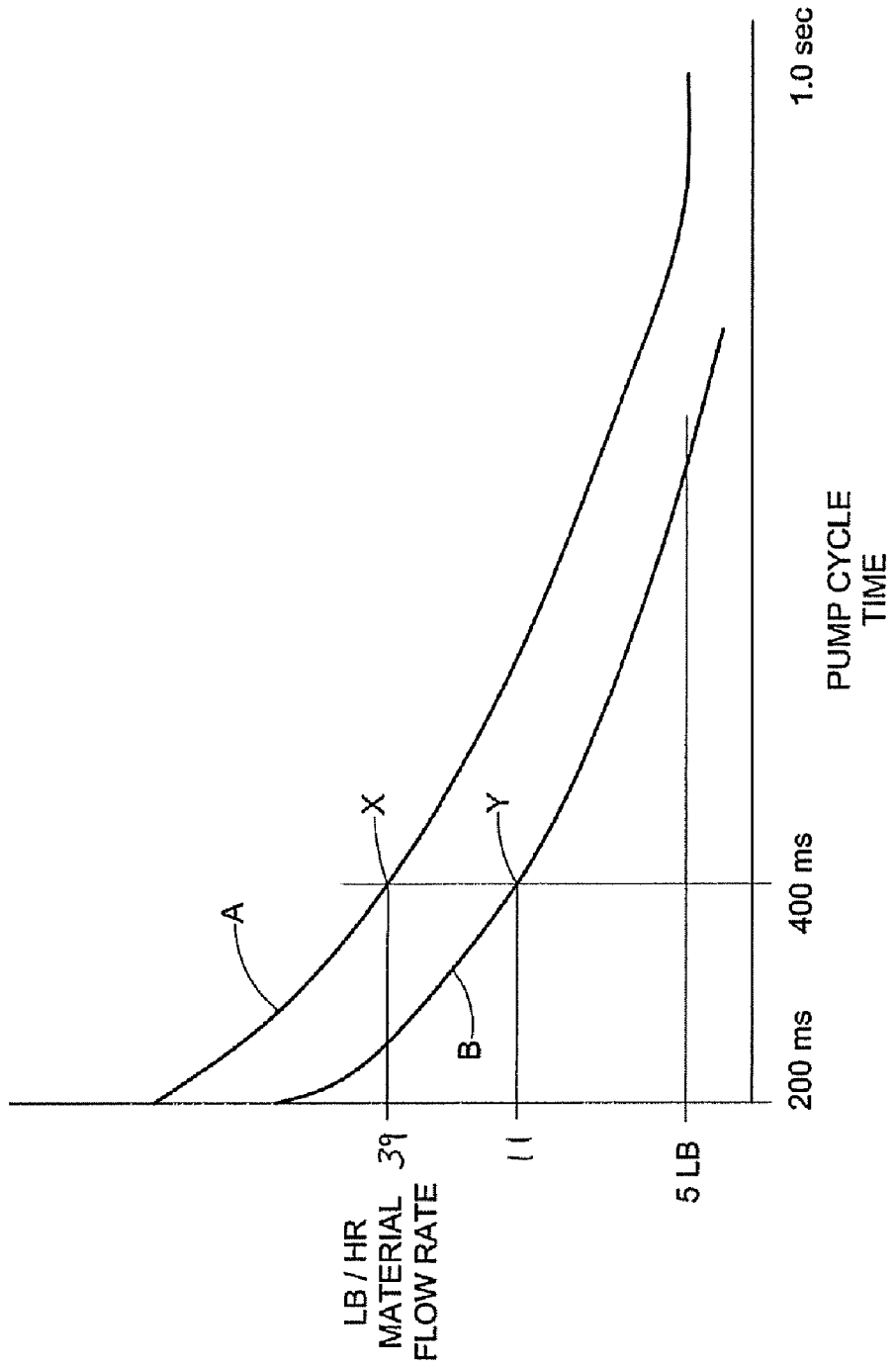
FIG. 12 is a representation of material flow rate curves for a pump operating in accordance with the invention.

FIG. 12 illustrates an inventive flow control aspect that is made possible by the independent control of the pinch valves 480, 481. This illustration is for explanation purposes and does not represent actual measured data, but a typical pump in accordance with the present disclosure will show a similar performance. The graph plots total flow rate in pounds per hour out of the pump versus pump cycle time. A typical pump cycle time of 400 milliseconds means that each pump chamber is filling or discharging during a 400 msec time window as a result of the application of negative and positive pressure to the pressure chambers that surround the porous members. Thus, each chamber fills and discharges during a total time of 800 msec. Graph A shows a typical response if the pinch valves are operated at the same time intervals as the pump chamber. This produces the maximum powder flow for a given cycle time. Thus, as the cycle time increases the amount of powder flow decreases because the pump is operating slower. Flow rate thus increases as the cycle time decreases because the actual time it takes to fill the pump chambers is much less than the pump cycle time. Thus there is a direct relationship between how fast or slow the pump is running (pump cycle time based on the time duration for applying negative and positive pressure to the pump pressure chambers) and the powder flow rate.

Graph B is significant because it illustrates that the powder flow rate, especially low flow rates, can be controlled and selected by changing the pinch valve cycle time relative to the pump cycle time. For example, by shortening the time that the suction pinch valves stay open, less powder will enter the pump chamber, no matter how long the pump chamber is in suction mode. In FIG. 12, for example, graph A shows that at pump cycle time of 400 msec, a flow rate of about 39 pounds per hour is achieved, as at point X. If the pinch valves however are closed in less than 400 msec time, the flow rated drops to point Y or about 11 pounds per hour, even though the pump cycle time remains at 400 msec. What this assures is a smooth consistent powder flow even at low flow rates. Smoother powder flow is effected by higher pump cycle rates, but as noted above this would also produce higher powder flow rates. So to achieve low powder flow rates but with smooth powder flow, the present invention allows control of the powder flow rate even for faster pump cycle rates, because of the ability to individually control operation of the suction pinch valves, and optionally the delivery pinch valves as well. An operator can easily change flow rate by simply entering in a desired rate. The control system 39 is programmed so that the desired flow rate is effected by an appropriate adjustment of the pinch valve open times. It is contemplated that the flow rate control is accurate enough that in effect this is an open loop flow rate control scheme, as opposed to a closed loop system that uses a sensor to measure actual flow rates. Empirical data can be collected for given overall system designs to measure flow rates at different pump cycle and pinch valve cycle times. This empirical data is then stored as recipes for material flow rates, meaning that if a particular flow rate is requested the control system will know what pinch valve cycle times will achieve that rate. Control of the flow rate, especially at low flow rates, is more accurate and produces a better, more uniform flow by adjusting the pinch valve open or suction times rather than slowing down the pump cycle times as would have to be done with prior systems. Thus the invention provides a scalable pump by which the flow rate of material from the pump can be, if desired, controlled without changing the pump cycle rate.

Figure 13:
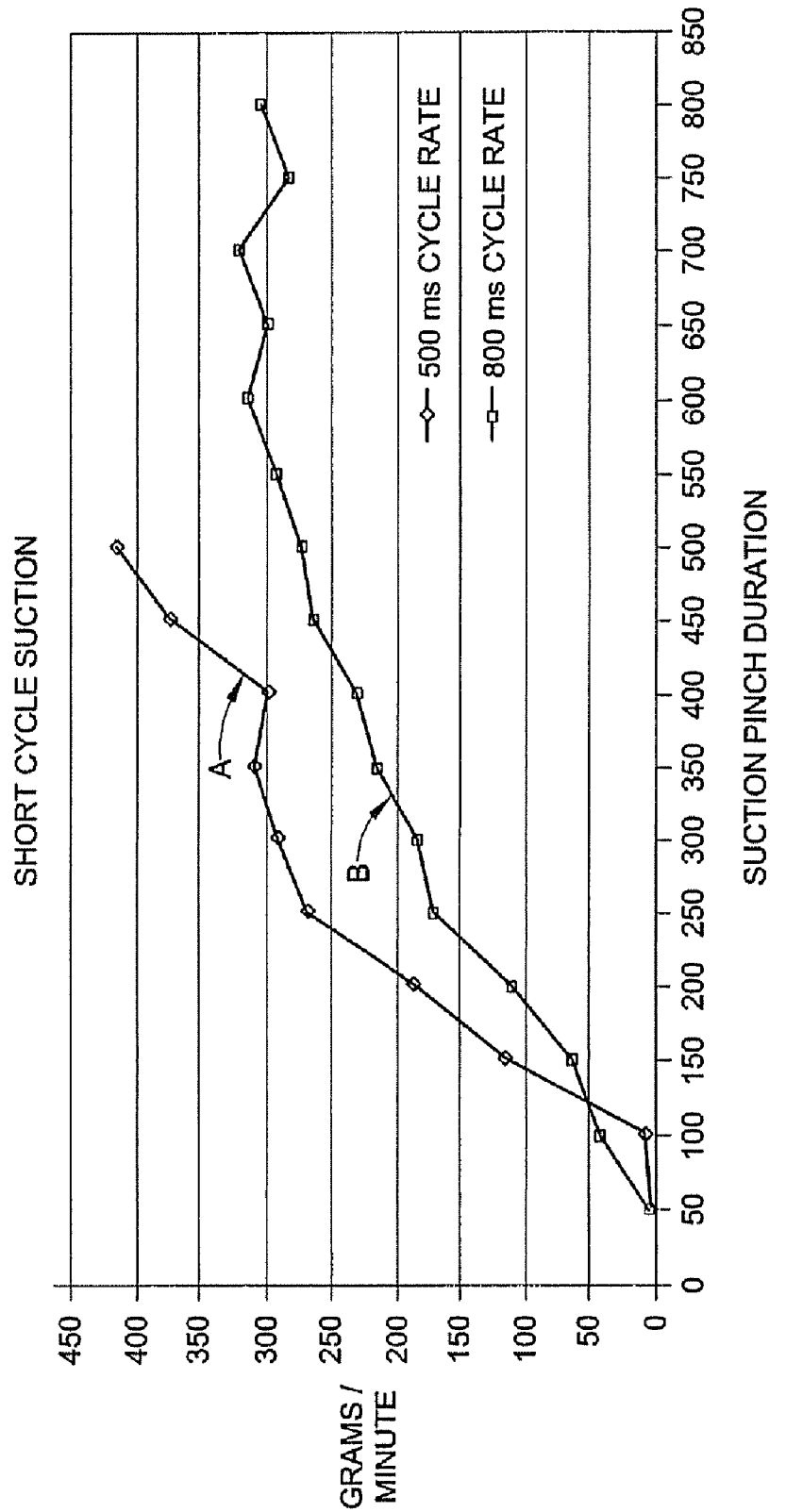
FIG. 13 is a graph depicting powder flow rates versus pinch valve open duration in milliseconds for two different pump cycle rates.

FIG. 13 further illustrates the exemplary pump control concept of the present inventions. Graph A shows flow rate versus pinch valve open duration (in milliseconds) at a pump cycle rate of 500 msec, and Graph B shows the data for a pump cycle rate of 800 msec. Both graphs are for dual chamber pumps as described herein. First it will be noted that for both graphs, flow rate increases with increasing pinch valve open times. Graph B shows however that the flow rate reaches a maximum above a determinable pinch valve open duration. This is because only so much powder can fill the pump chambers regardless of how long the pinch valves are open. Graph A would show a similar plateau if plotted out for the same pinch valve duration times. Both graphs also illustrate that there is a determinable minimum pinch valve open duration in order to get any powder flow from the pump. This is because the pinch valves must be open long enough for powder to actually be sucked into and pushed out of the pump chambers. Note that in general the faster pump rate of Graph A provides a higher flow rate for a given pinch valve duration.

The data and values and graphs provided herein are intended to be exemplary and non-limiting as they are highly dependent on the actual pump design. The control system 39 is easily programmed to provide variable flow rates by simply having the control system 39 adjust the valve open times for the pinch valves and the suction/pressure times for the pump chambers. These functions are handled by the material flow rate control 632 process.

In an alternative embodiment, the material flow rate from the pump can be controlled by adjusting the time duration that suction is applied to the pump pressure chamber to suck powder into the powder pump chamber. While the overall pump cycle may be kept constant, for example 800 msec, the amount of time that suction is actually applied during the 400 msec fill time can be adjusted so as to control the amount of powder that is drawn into the powder pump chamber. The longer the vacuum is applied, the more powder is pulled into the chamber. This allows control and adjustment of the material flow rate separate from using control of the suction and delivery pinch valves.

Use of the separate pinch valve controls however can augment the material flow rate control of this alternative embodiment. For example, as noted the suction time can be adjusted so as to control the amount of powder sucked into the powder chamber each cycle. By also controlling operation of the pinch valves, the timing of when this suction occurs can also be controlled. Suction will only occur while negative pressure is applied to the pressure chamber, but also only while the suction pinch valve is open. Therefore, at the time that the suction time is finished, the suction pinch valve can be closed and the negative pressure to the pressure chamber can be turned off. This has several benefits. One benefit is that by removing the suction force from the pressure chamber, less pressurized process air consumption is needed for the venturi pump that creates the negative pressure. Another benefit is that the suction period can be completely isolated from the delivery period (the delivery period being that time period during which positive pressure is applied to the pressure chamber) so that there is no overlap between suction and delivery. This prevents backflow from occurring between the transition time from suction to delivery of powder in the powder pump chamber. Thus, by using independent pinch valve control with the use of controlling the suction time, the timing of when suction occurs can be controlled to be, for example, in the middle of the suction portion of the pump cycle to prevent overlap into the delivery cycle when positive pressure is applied. As in the embodiment herein of using the pinch valves to control material flow rate, this alternative embodiment can utilize empirical data or other appropriate analysis to determine the appropriate suction duration times and optional pinch valve operation times to control for the desired flow rates. During the discharge or delivery portion of the pump cycle, the positive pressure can be maintained throughout the delivery time. This has several benefits. By maintaining positive pressure the flow of powder is smoothed out in the hose that connects the pump to a spray gun. Because the suction pinch valves can be kept closed during delivery time, there can be an overlap between the end of a delivery (i.e. positive pressure) period and the start of the subsequent suction period. With the use of two pump chambers, the overlap assures that there is always positive pressure in the delivery hose to the gun, thereby smoothing out flow and minimizing pulsing. This overlap further assures smooth flow of powder while the pinch valves can be timed so that positive pressure does not cause back flow when the suction pinch valves are opened. Again, all of the pinch valve and pressure chamber timing scenarios can be selected and easily programmed into the control system 39 to effect whatever flow characteristic and rates are desired from the pump. Empirical data can be analyzed to optimize the timing sequences for various recipes.

The present disclosures contemplate a dense phase pump that is highly efficient in terms of the use of pressurized process air needed to operate the pump. As noted above, the suction pressure optionally can be turned off as part of the pump flow rate control process because the pinch valves can be separately timed. This reduces the consumption of process air for operating the venturi pump that produces the negative suction pressure. The use of dense phase transport allows for smaller powder flow path geometries and less air needed to transport material from the pump to the gun. Still further, the pinch valves operate in a normally open mode, thus there is no need for air pressure or a control member or device to open the pinch valves or to maintain them open.

Thus, the inventive pump design herein may be used to provide a scalable material flow rate pump output by which is meant that the operator can select the output flow rate of the pump without having to make any changes to the system other than to input the desired flow rate. This can be done through any convenient interface device such as a keyboard or other suitable mechanism, or the flow rates can be programmed into the control system 39 as part of the recipes for applying material to an object. Such recipes commonly include such things as flow rates, voltages, air flow control, pattern shaping, trigger times and so on.

We have discovered a number of operational and performance characteristics of a pump that incorporates one or more of the inventive aspects and features described hereinabove, or which may be present in other pump designs that use porous tubes, wherein such characteristics may result in reduced performance in some circumstances. We have further discovered alternative and/or optional control processes that may be used to improve these operational and performance characteristics for not only the pump designs described herein, but other dense phase pump designs of the type that utilize porous barriers to alternately apply suction and positive pressure to a pump chamber.

For example, we have discovered that because dense phase powder is by definition a rich mixture with reduced air content, there is a tendency for the mixture to have somewhat of an inertia which initially resists the sucking of powder into the pump chambers 438c, 440c in the beginning portion of a suction condition. This inertia exists in part because the powder has been sitting in the powder path to the pump while powder is being delivered under pressure during the delivery portion of the pump cycle. In accordance with an inventive aspect of this disclosure, the suction pinch valves and related control valves may be sequenced or timed so as to produce a suction spike of higher energy in the beginning portion of a suction condition or time duration. This spike helps overcome the inertia of the dense phase powder to begin moving powder into the pump chamber. After the initial spike the suction pressure typically will reduce to a desired or predetermined range. The spike effect may be unnecessary for mixtures and/or pump designs that do not exhibit the inertial delay for powder flow into the pump chamber.

As another example, porous materials such as may be used, for example, for the pump chamber tubes 438, 440 tend to become obstructed over time, or "blind". This occurs simply due to the fact that very small powder particles inevitably become lodged in or against the porous material. Thus, over time the porosity of the material to air flow decreases. We have discovered that the pump tubes 438, 440 tend to become "seasoned" over a period of time and remain somewhat in that condition for perhaps a number of hundreds of hours of operation before becoming blinded to the point that insufficient air flow through the porous material can be maintained. In accordance with another inventive aspect, by early application of a lower and optionally optimized suction force, the time period during which the tubes "season" can be significantly extended, thus extending the overall useful life of the tubes 438, 440. For example, the suction force applied to suck powder into the pump chambers may be set at a level or range that is just sufficient to ensure powder will adequately be drawn into the pump chamber. This feature may be used optionally with the initial spike concept described above. By using a reduced suction force the tubes take much longer to season and thus will not blind for a longer period of time. Note that by "early" in this context we are referring to the useful life of the tubes and applying a suction force applied during new pump or new tube operation, not the initial suction time when the optional higher spike may be also used.

In accordance with another inventive aspect, tube blinding is compensated for by optionally implementing a flow rate control feature. As noted above, as the tubes 438, 440 blind over time, the flow rate of air through the porous material decreases for a given applied force or pressure whether that pressure be suction or delivery (delivery meaning positive pressure to push powder out of the pump chambers.) In accordance with another inventive aspect, flow rate control may be used to increase the applied pressure so as to maintain a desired air flow rate, for example, to maintain a desired or predetermined minimum flow rate to assure powder is adequately sucked in and pushed out of the pump chamber. The predetermined or desired values or ranges may differ for suction and delivery or in some cases may be the same. Flow rate control may be implemented for positive pressure delivery air flow, suction pressure air flow, or both.

All of these inventive aspects may optionally be used together, alone or in various combinations. Additionally they may be used with dual pump chambers as in the exemplary embodiments herein above, single pump chamber designs or pumps having more than two pump chambers.

For purposes of more clearly illustrating the inventive concepts and features noted above, we refer to various figures and illustrations herein that exemplify the functional control aspects for operation of a pump, such as for example, a pump as described herein above. Even though these function and control aspects are explained herein in the context of an exemplary pump design, those skilled in the art will readily appreciate that these inventive aspects may find application in many other pump designs and configurations.

Figure 14:
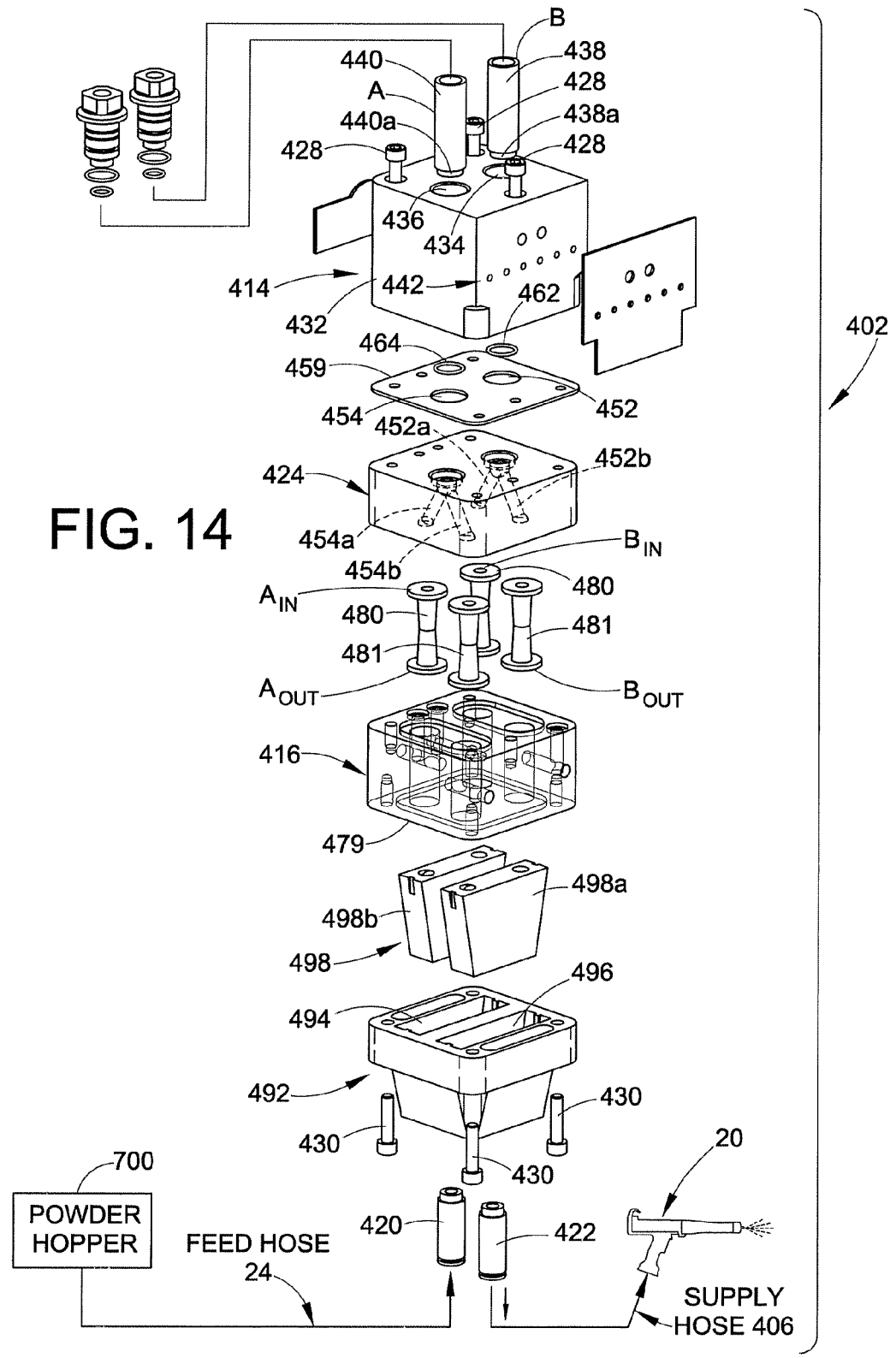
FIG. 14 is similar to FIG. 2B but labeled differently to indicate various control elements.

A suitable pump for explaining these enhancements is illustrated in FIG. 14. This figure is the same embodiment as FIG. 2B hereof but with different or additional identifying numbers and letters to highlight various control elements. The pump 402 has two filter sleeves or porous tubes A and B which comprise the two pumping chambers of this pump. These chambers alternately receive powder from a powder hopper 700 and discharge that powder to a spray gun 20. Four pinch valves control the flow of powder into and out of these two pump chambers. There are two pinch valves for each pump chamber. These pinch valves are marked A-in, A-out, B-in and B-out. A-in allows powder to enter chamber A from the feed hose 24 connected to a powder hopper and A-out allows powder to be delivered or discharged from chamber A through the supply hose 406 to the spray gun 20. Likewise, B-in allows powder to enter chamber B from the same feed hose 24 connected to the same powder hopper and B-out allows powder to be discharged from chamber B through the same supply hose connected 406 to the same spray gun 20.

Figure 15:
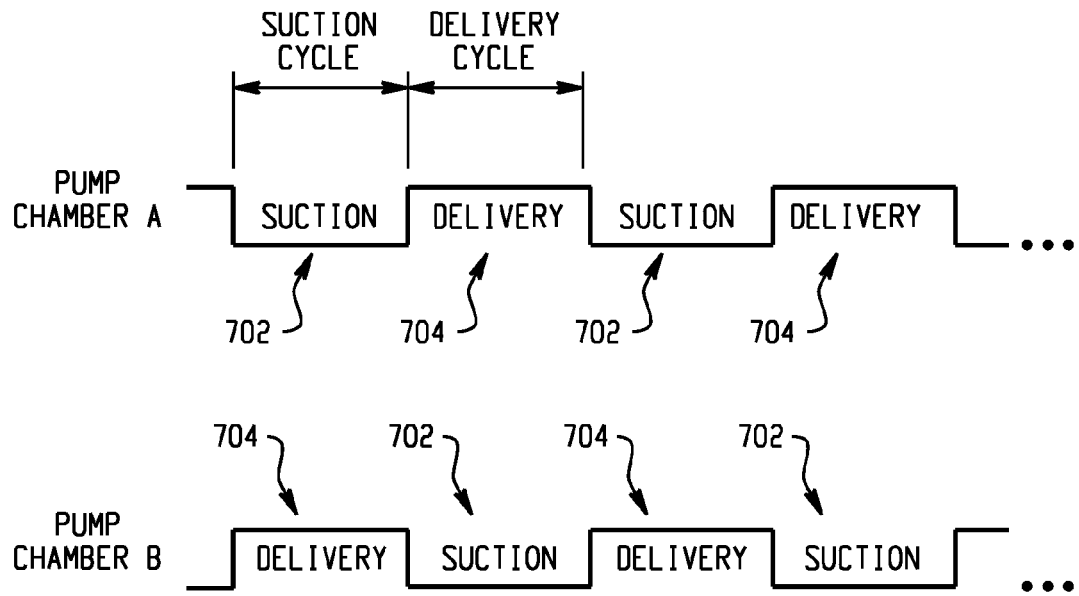
FIG. 15 illustrates idealized pump cycle timing for a two chamber pump.

FIG. 15 shows an idealized timing for the delivery and suction conditions in chambers A and B. As shown, each chamber has a suction cycle 702 during which powder is pulled into the chamber and a pressure or delivery cycle 704 during which powder is pushed out of the chamber. The cycles would be about equal in duration and chamber A and B would alternate so that while powder was being pulled into chamber A it was being pushed out of chamber B and vice versa. Given this mode of operation, it was deemed adequate that the suction condition in a chamber would be a relatively constant suction force being applied during the entire suction cycle. By "suction condition" is meant a time period when negative pressure exists in the pump pressure chamber.

Figure 16:
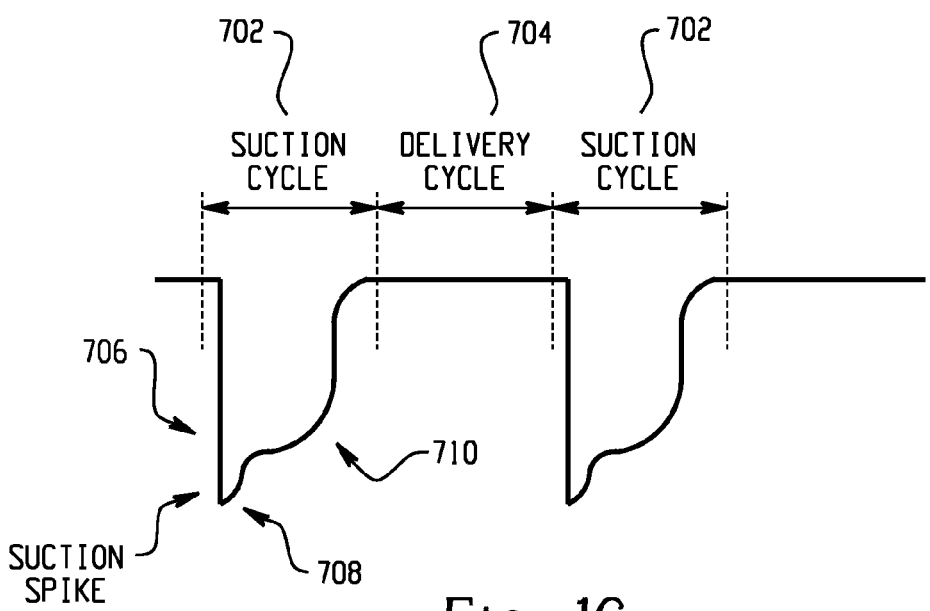
FIG. 16 illustrates a modified suction cycle for one of the pump chambers.

FIG. 16 shows one of the inventive aspects wherein instead of applying relatively constant suction force to chamber A during the entire suction cycle, a suction condition 706 is generated in chamber A during a portion of the suction cycle that is less than the duration of the suction cycle. In an exemplary embodiment, the suction condition is applied about in the middle portion of the suction cycle, and in addition, the suction condition starts with a spike or pulse 708 of a relatively higher suction force which then reduces to a lower level 710 of suction force. The suction spike overcomes the inertia of the static powder lying in the feed hose and gets the powder moving. Thereafter, the reduced suction level in chamber A is sufficient to keep the powder moving until the desired amount of powder has been received in chamber A and the suction is terminated. The same suction condition is created in chamber B during the suction cycle for chamber B.

The concept of approximately centering the suction condition within the suction cycle, and the concept of producing the spike, are separate concepts that may be used together or individually as needed for a particular application.

Figure 17:
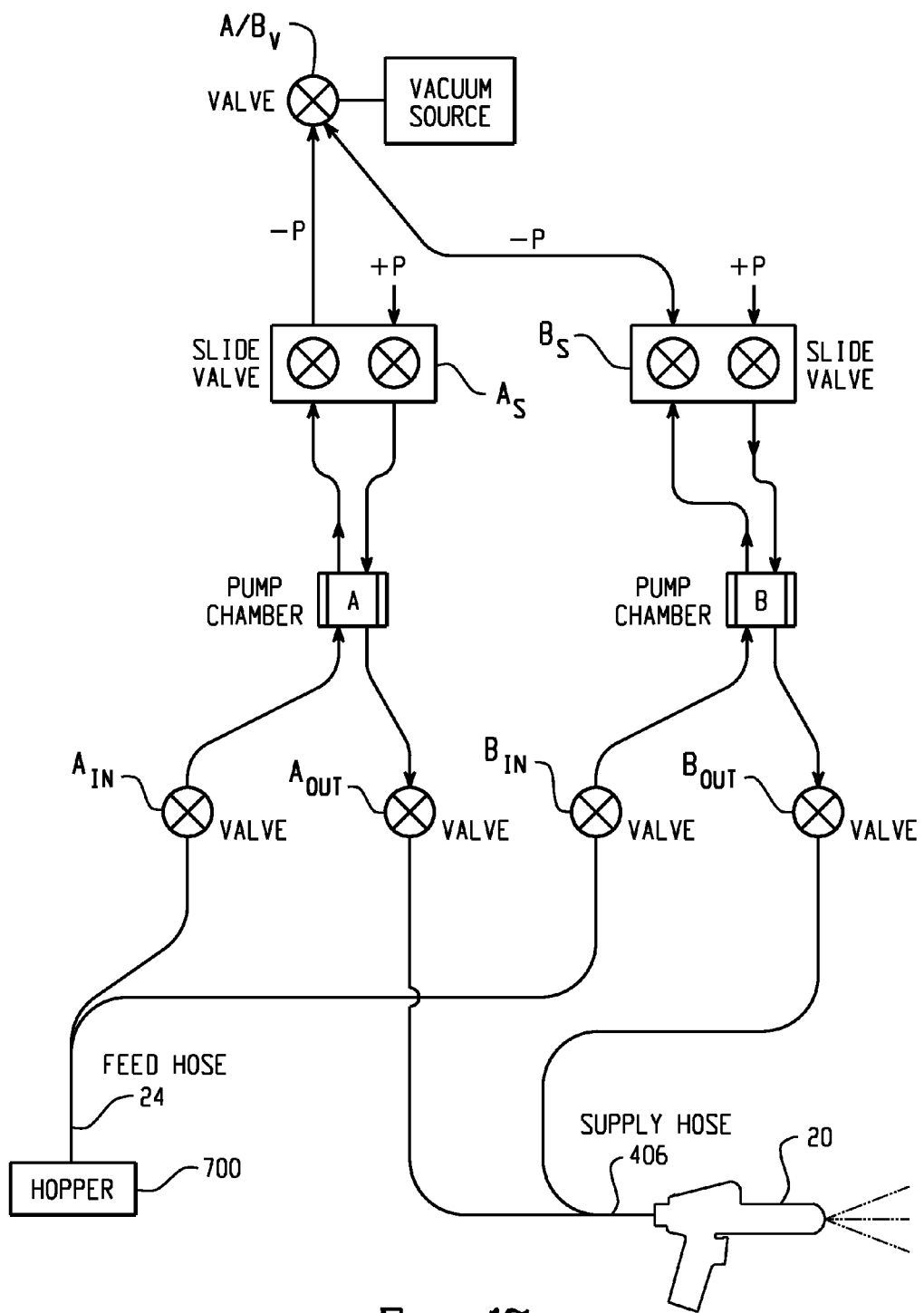
FIG. 17 is a functional diagram of a pneumatic control for a pump.

FIG. 17 shows an exemplary manner in which the suction condition shown in FIG. 16 may be produced in chambers A and B. A vacuum control valve A/B-v is activated to produce a vacuum or negative pressure condition $^-$P when a suction condition is required in either chamber A or B. With respect to chamber A, a two position valve A-s can be shifted between a positive pressure position $^+$P and a suction position $^-$P. During the suction cycle 702, A-s is shifted to the suction position to allow the vacuum controlled by valve A/B-v to be applied to chamber A during a selectable portion 706 of the suction cycle 702 that the control valve A/B-v is generating a vacuum. To produce a suction spike such as for example shown in FIG. 16, vacuum generator control valve A/B-v is turned on during for example, a middle portion of the suction cycle 702 as shown in FIG. 16, but initially pinch valves A-in and A-out are both kept closed. This causes the vacuum condition to build and intensify in the pump chamber A. When pinch valve A-in is then opened to allow powder to be sucked into chamber A from the powder feed hose 24, the powder in the hose is initially hit with or is exposed to the suction spike 708 to overcome the powder's inertia and get it moving. Shortly after the valve A-in is opened, the level of the suction in chamber A drops off to a relatively more constant lower level 710 which keeps the powder moving into the pump chamber A. Once the desired amount of powder is received within chamber A, the vacuum generating control valve A/B-v is turned off and valve A-in is closed. The same suction condition may be created in chamber B during the suction cycle for chamber B.

The reduced suction level 710 may be controlled by way of the valve A/B-v. This valve A/B-v may for example be a servo valve that controls the flow of air to the venturi pump 518 or other source of negative pressure used for the pump pressure chambers. The amount of suction produced may optionally be a predetermined value or range that is optimized or near optimized to a minimum level needed to assure that powder is adequately sucked into the powder chamber 438c, 440c during a suction condition. This minimum or at least a reduced suction force may be determined empirically for example, as it will be influenced by the choice of venturi pump, valve design, powder path size and length, powder pump chamber volume and so on. In accordance with an inventive aspect, the reduced suction value may optionally be used to extend the useful life of the porous tubes 438, 440 because the lower suction force will slow down blinding of the tubes and reduce impact fusion, as described herein above.

Figure 18:
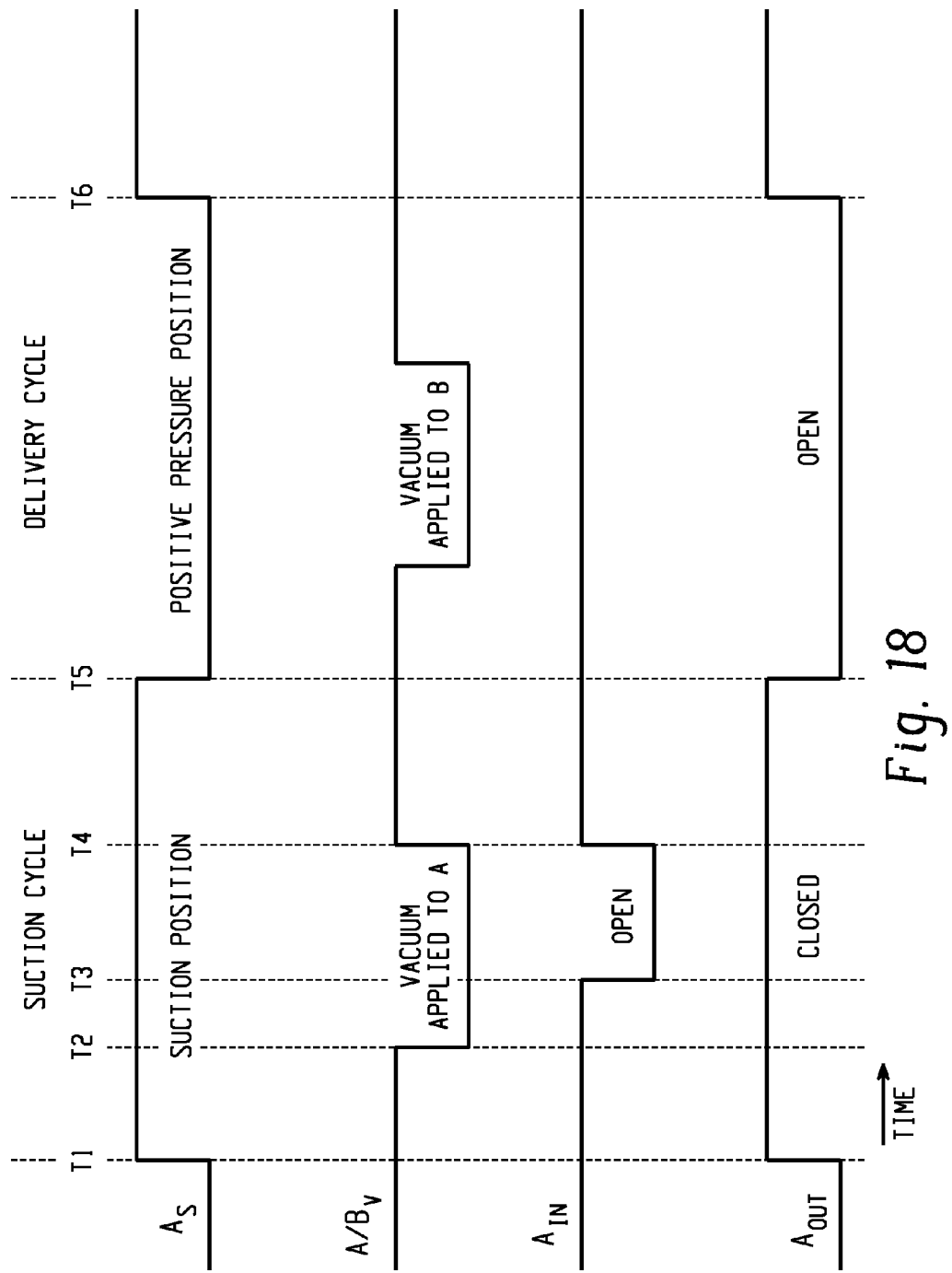
FIG. 18 is an exemplary timing diagram for the control process represented in FIGS. 16 and 17.

FIG. 18 shows exemplary timing waveforms for the electrical signals controlling the valves for A-in, A-out, A-s and A/B-v of FIG. 17. As shown, A-s is open to pass through any suction force generated under control of A/B-v during the entire suction cycle. The valve A-s shifts to this suction position at time T1 which is the start of the suction cycle for chamber A. At time T2, A/B-v is actuated to apply a suction condition to chamber A. At this time, A-in and A-out are both closed so the vacuum force is allowed to intensify in chamber A. At time T3, A-in is opened and the vacuum force which has been building in chamber A sucks powder from the supply hose through valve A-in into chamber A. As previously mentioned, this suction condition optionally starts with a suction spike which gets the powder moving and overcomes the inertia of the powder lying in the hose. At time T4, after the desired amount of powder has been drawn into chamber A, A-in closes to cut off the entry of additional powder into chamber A, and at the same time A/B-v closes to cut off the source of the vacuum. At time T5, A-s shifts to its positive pressure position to end the suction cycle and begin the delivery cycle, and at about the same time A-out is opened to allow powder to be pushed out of chamber A through the feed hose to the gun by an air pressure source indicated in FIG. 17. The delivery cycle ends at time T6 when the A-s valve shifts to the suction position shown at time T1 to begin the next suction cycle. Note that the suction duration (i.e. the time T2-T4) applied to chamber A by suction source A/B-v, may be generally centered within the suction cycle T1-T5 for reasons explained herein below. Notice also that the suction cycle T1-T5 has about the same duration as the delivery cycle T5-T6. This is preferred, of course, because while chamber A is undergoing the suction cycle, chamber B is undergoing the delivery cycle and vice versa.

With respect to FIG. 18, note that the flow rate of powder delivered by the pump is largely determined by the duration T3-T4 which is the amount of time that valve A-in is open. The longer A-in is open, the greater the amount of powder drawn into and pushed out of chamber A at each cycle and the higher the flow rate from the pump. Conversely, the shorter the duration that A-in is open, the lower the flow rate of the pump. As noted herein above, however, there is a practical limit to the powder flow rate after the pinch valves are open an amount of time that fills the pump chamber.

Notice also that the length of the suction and delivery cycles affect the uniformity of powder flow from the pump. If the duration of the cycles is relatively long, there is more time for a greater amount of powder to be pulled into the pump chambers each cycle, and when the powder is pushed out of the chambers it is more likely to faun as pulses or shots of powder with relatively long interval between these pulses. The result of this is a pulsing powder supply to the spray gun which is less desirable in that it may produce a pulsing spray pattern discharged from the gun. If the duration of the cycles is relatively short, on the other hand, then smaller amounts of powder are pulled into the pump chambers during the shorter cycles and these smaller volumes of powder are pushed out of more frequently from the pump to the supply hose with shorter intervals between these smaller pulses with the overall effect being a more uniform flow rate of powder to the spray gun and a better more uniform cloud of powder dispensed from the spray gun. If the pump is run too fast, however, the frequent opening and closing of the pinch house generates heat which can cause the powder to cure inside the pump and can also cause premature failure of pump components. Consequently, it is desirable to operate at a high enough cycle rate and short enough cycle time to maintain uniform powder flow to the gun, but at a cycle rate which is no higher than needed to accomplish that purpose.

Figure 19:
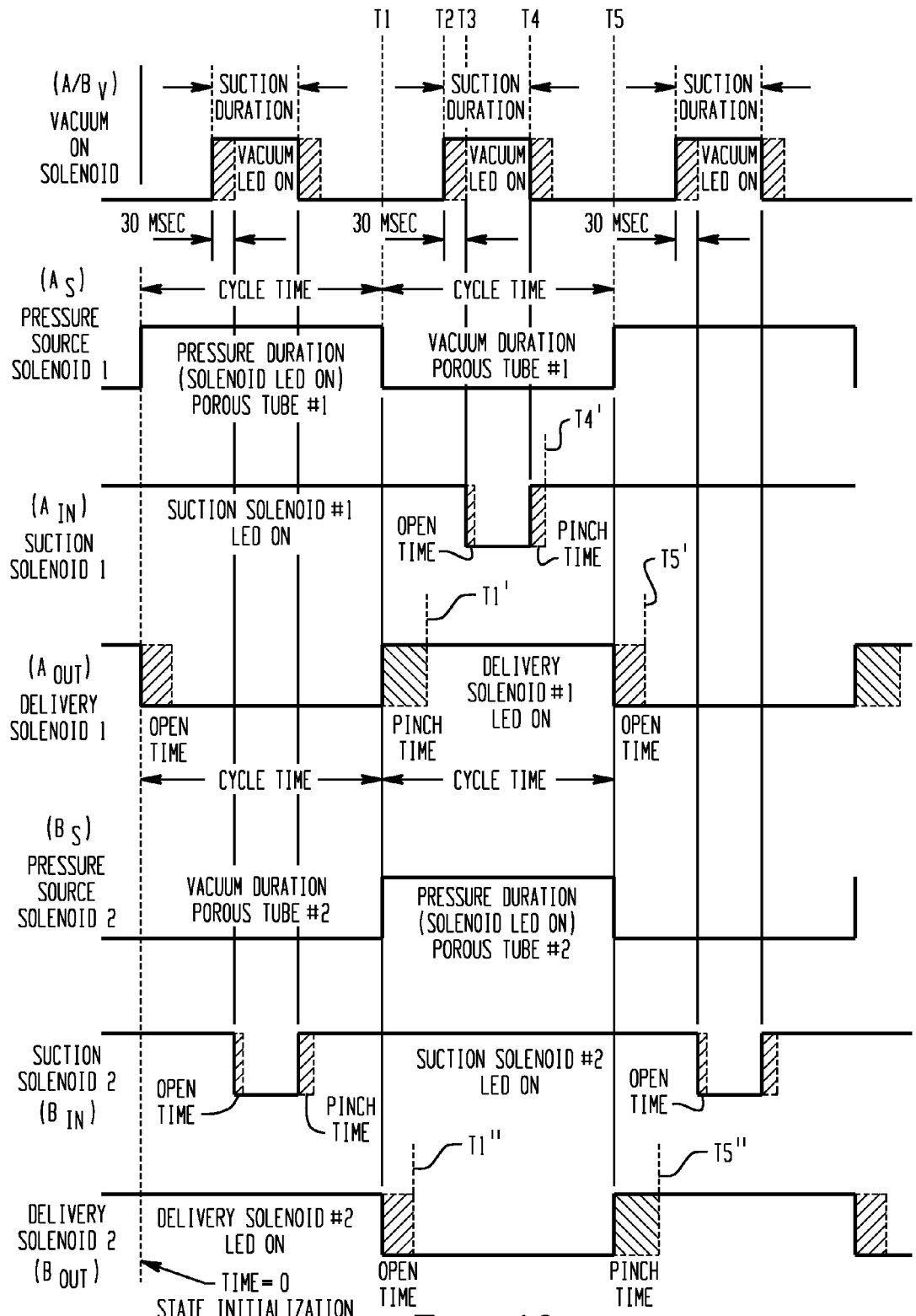
FIG. 19 is an exemplary timing diagram for a two chamber pump such as in FIG. 17 to produce a vacuum or suction spike.

FIG. 19 shows further details of the pump operation and why it is preferred to center the suction duration T2-T4 within the suction cycle T1-T5. This figure shows typical response times for the opening and closing of the valves in the system as shaded cross hatched regions. The response time for closing pinch valve A-in for example, extends for approximately 25 milliseconds after T4 (denoted as T4' on the drawing). That means once the signal is given to valve A-in to close, the valve takes approximately 25 milliseconds to reach its fully closed condition at T4'. It may be important in many systems that this response time be shorter than the duration T4-T5 so that A-in is fully closed before A-s shifts to blow powder from out of chamber A through valve A-out into the supply hose 406. If A-in were not fully closed before this shift occurred, some powder could be blown in the backwards direction through A-in causing a reversal of powder flow down the supply hose from the pump towards the hopper, which in some cases may be undesirable. By centering the suction duration within the suction cycle, opening and closing response times for the valves are allowed to time out properly to avoid this type of problem. Note that the response times for the various pinch valves A-in, A-out, B-in and B-out may be different depending upon whether the valve is being opened or closed or used for delivery or suction.

FIG. 19 also illustrates that the delivery valves A-out and B-out also exhibit inherent open and close response times, however, these pinch valves can be permitted to overlap into the subsequent suction cycle because the suction condition is restricted to time period T3-T4. For example, in FIG. 19, valve A-out fully closes at time T1' which extends into the suction cycle that begins at time T1, but since the suction condition does not occur until time T3 (really T3' allowing for response time of A-in to fully open) there is no blow back. This allows the delivery pinch valves A-out and B-out to overlap (compare T1' and T1" as well as T5' and T5') so that optionally positive pressure is always provided to the feed hose 406 to the gun 20.

Figure 20:
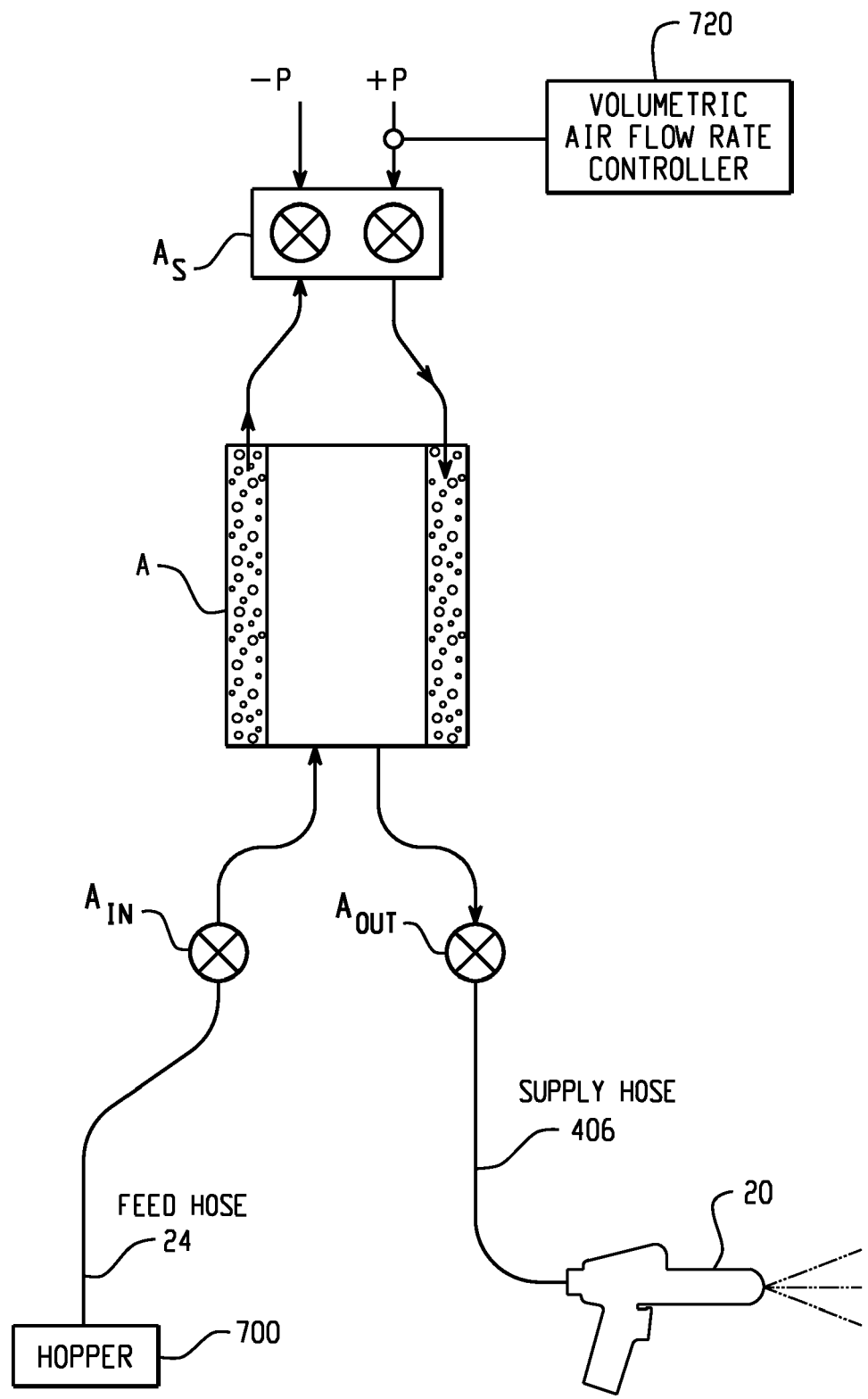
FIG. 20 is a schematic representation of a single pump chamber control function using a flow rate control feature.
Figure 21:
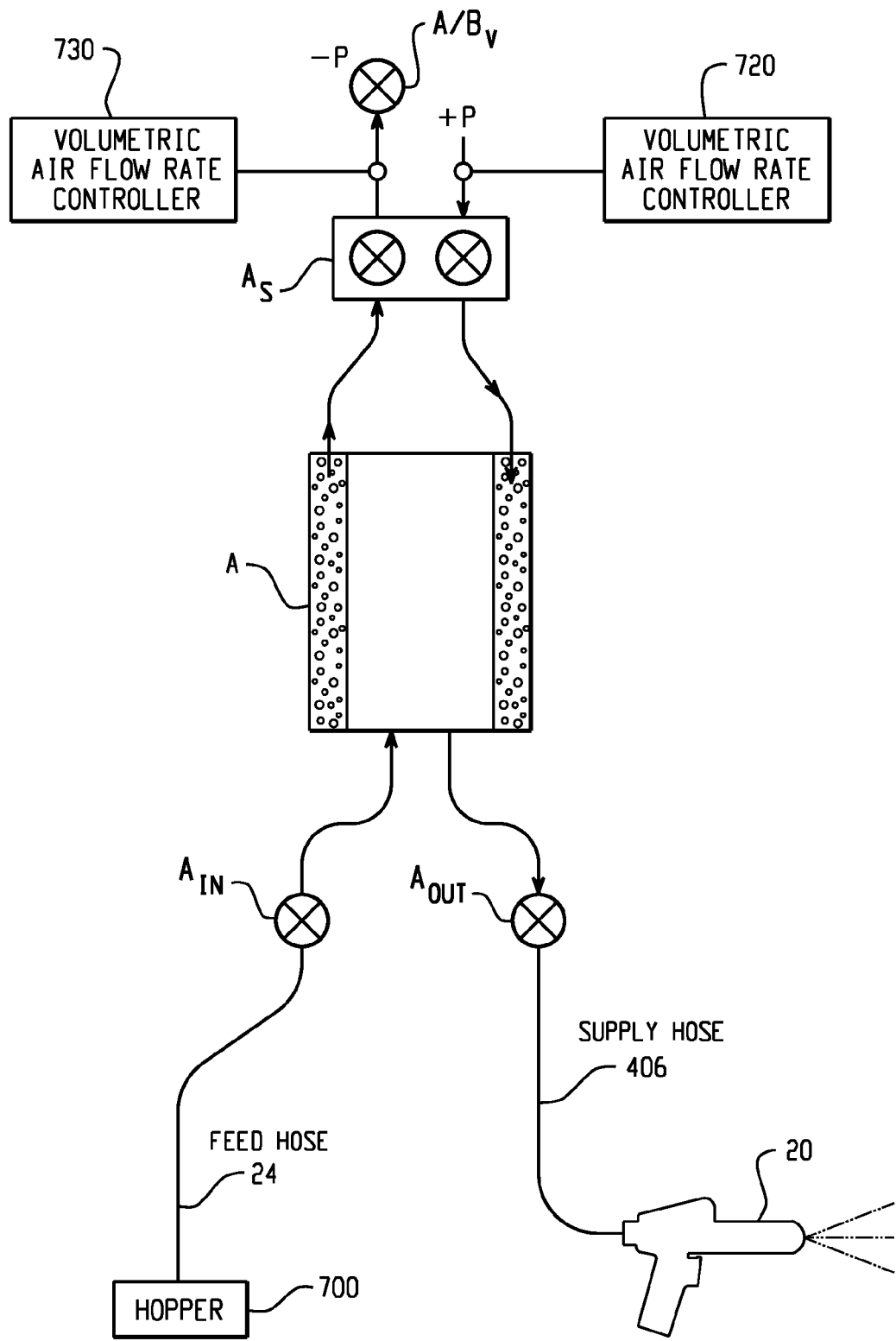
FIG. 21 is a schematic representation of a single pump chamber control function using a flow rate control feature on the positive and negative pressure portions of a pump chamber.

FIG. 20 shows the optional use of a volumetric air flow rate controller 720 to push the powder out of the chamber A. The volumetric air flow rate controller ensures that powder is pushed out of the chamber A at the desired rate. If the powder is pushed out too fast, then concentrated slugs of powder form in the supply hose to the gun and the powder is delivered in a pulsed fashion to the spray gun which causes the gun to spray a pulsed spray pattern which is undesirable. This is the same phenomena which can occur if the cycle rate is too slow as described above. If the powder is pushed out at a slower rate, the powder will be more spread out in the supply hose to the gun which produces a more even spray pattern at the gun. However, if the pump 518 that creates the negative pressure or suction. However, other flow rate sensing and control techniques may alternatively be used.

The air flow rate controllers 720, 730 may operate by use of look-up tables that relate detected pressure drops across the control orifices with corresponding flow rates. The flow rates for suction and delivery may be the same or different. A suitable control function such as a programmable processor may access the database and also produce suitable control signals such as PWM signals to the control valves 722, 732. The valves may, on the first operational cycle after start-up of the pump, be opened to a default setting that produces an air flow rate across the orifices that acts as a "seed" value. The valves are then adjusted as needed so that the suction and delivery flow rates are kept at a desired value or range for a particular pump operation. Another optional control feature is that an operator interface may be conveniently provided to allow an operator to "dial in" or adjust or select a desired pump flow rate. This setting results in the control system 39 adjusting the air flow rates needed to achieve the desired pump operation.

Figure 22A:
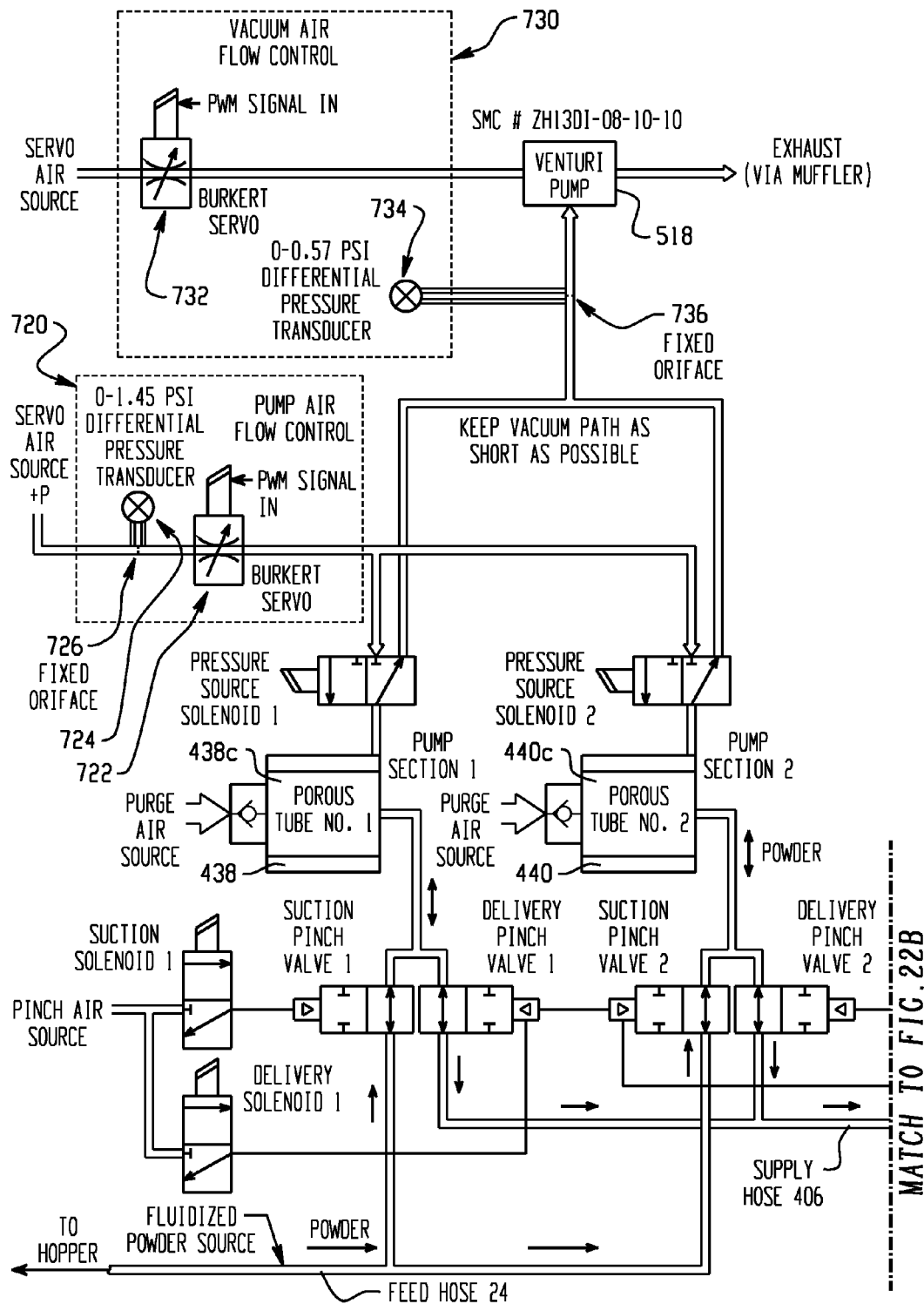

FIGS. 22A and 22B show that the servo valve 732 is used to modulate the air source feeding the vacuum generator 518 and not directly modulating the vacuum output. This may be done for at least two reasons: a) there is a relatively wide linear relationship between input pressure and the resulting vacuum output; and b) the servo has much more source pressure (for example, up to about 85 psi) to modulate than if it were controlling the vacuum pressure directly (i.e. a source pressure of about −8 psi for example). The differential pressure transducer selected is also different from the ones used in the other air flow control circuits because of this relatively small vacuum pressure level. The selected differential transducer's range of operation is from 0 to 0.57 psi. In this case, only about 7% of the available vacuum is lost as a drop across the sensor, for example.

Given the features and capabilities of the pump described above which work together to ensure that a uniform flow rate of powder can be provided by this pump over a wide range of powder flow outputs, yet another novel aspect of this pump is its capability of providing recipes which can be used to tailor the powder flow from the pump in an optimal way for the particular application for which the pump is being used. The pump powder flow recipes can contain the following parameters: suction cycle duration (T1-T5), suction duration (T2-T4) and flow rate setting for air used to push powder out of the chambers. Numerous powder flow recipes for various applications can be stored in a suitable data structure as a look up table for quick access as needed by the user.

The inventions have been described with reference to the exemplary embodiments. Modifications and alterations will occur to others upon a reading and understanding of this specification and drawings. The inventions are intended to include all such modifications and alterations insofar as they come within the scope of the appended claims or the equivalents thereof.

We claim:

1. A method for pumping powder, comprising:
   a. applying suction to a first annular chamber surrounding a first cylindrical filter element to create suction within a first volume enclosed by the first cylindrical filter element during a suction cycle to draw powder through a first pinch valve into the first volume;
   b. applying positive pressure air through a first positive pressure air conduit to the first annular chamber surrounding the first filter element to create a positive pressure condition within the first volume enclosed by the first filter element during a delivery cycle to push powder out of the first volume through a second pinch valve that was drawn into the first volume during the suction cycle;
   c. applying suction to a second annular chamber surrounding a second cylindrical filter element to create suction within a second volume enclosed by the second cylindrical filter element during a suction cycle to draw powder through a third pinch valve into the second volume;
   d. applying positive pressure air through a second positive pressure air conduit to the second annular chamber surrounding the second filter element to create a positive pressure condition within the second volume enclosed by the second filter element during a delivery cycle to push powder out of the second volume through a fourth pinch valve that was drawn into the second volume during the suction cycle;
   e. separating each suction cycle for the first volume from each delivery cycle for the first volume, and separating each suction cycle for the second volume from each delivery cycle for the second volume;
   f. monitoring a condition related to air flow rate through the first positive pressure air conduit during the delivery cycle of said first volume to generate a first signal, wherein said condition changes with reduced porosity of said first cylindrical filter element;
   g. monitoring a condition related to air flow rate through the second positive pressure air conduit during the delivery cycle of said second volume to generate a second signal, wherein said condition changes with reduced porosity of said second cylindrical filter element;
   h. comparing said first signal to a reference value and if the comparison indicates that reduced porosity of said first cylindrical filter element has occurred, adjusting air pressure in said first positive pressure air conduit in response to that comparison; and
   i. comparing said second signal to a second reference value and if the comparison indicates that reduced porosity of said second cylindrical filter element has occurred, adjusting air pressure in second positive pressure air conduit in response to that comparison.

2. The method of claim 1 wherein the step of monitoring a condition of the air flow comprises the step of monitoring the flow rate of the air flow by determining pressure drop across an orifice disposed in a flow path for air into the volume.

3. The method of claim 1 comprising the step of controlling flow rate of air from the volume during a suction time of the suction cycle.

4. The method of claim 1 comprising the step of using the applied suction and applied positive pressure to effect open loop control of the powder flow rate.

5. The method of claim 1 wherein said signal comprises a pressure transducer signal.

6. The method of claim 1 wherein said first and second references values are the same value.

7. The method of claim 6 wherein said reference value is an air flow rate value.

8. The method of claim 1 wherein the step of adjusting air pressure in said first positive pressure air conduit causes an increased flow rate of air through the first positive pressure air conduit; and the step of adjusting air pressure in said second positive pressure air conduit causes an increased flow rate of air through the second positive pressure air conduit.

9. The method of claim 8 wherein the steps of causing an increased flow rate of air maintains a predetermined minimum air flow rate of air through said first and second positive pressure air conduits.

* * * * *